United States Patent
Jackson et al.

(10) Patent No.: US 9,352,355 B1
(45) Date of Patent: *May 31, 2016

(54) PARTICLE-PLASMA ABLATION PROCESS

(71) Applicants: David P. Jackson, Santa Clarita, CA (US); Jeffrey D. Endres, La Mesa, CA (US)

(72) Inventors: David P. Jackson, Santa Clarita, CA (US); Jeffrey D. Endres, La Mesa, CA (US)

(*) Notice: Subject to any disclaimer, the term of this patent is extended or adjusted under 35 U.S.C. 154(b) by 314 days.

This patent is subject to a terminal disclaimer.

(21) Appl. No.: 13/863,311

(22) Filed: Apr. 15, 2013

Related U.S. Application Data

(60) Provisional application No. 61/624,322, filed on Apr. 15, 2012.

(51) Int. Cl.
*B23K 10/00* (2006.01)
*B05D 3/10* (2006.01)

(52) U.S. Cl.
CPC .. *B05D 3/10* (2013.01); *B23K 10/00* (2013.01)

(58) Field of Classification Search
CPC ........... B23K 26/0066; B23K 26/0072; B23K 26/0075; B23K 26/0093; B23K 26/14; B23K 26/16; B23K 26/365; B23K 10/00; B24C 1/00; B24C 1/003; B24C 1/08; B24C 1/086; B08B 7/00; B08B 7/04
USPC ........................ 134/1, 1.1, 1.2; 219/121.36, 219/121.4–121.43, 121.59, 121.69, 121.84, 219/121.85
See application file for complete search history.

(56) References Cited

U.S. PATENT DOCUMENTS

| | | |
|---|---|---|
| 2,302,289 A | 11/1942 | Bramston-Cook |
| 2,894,691 A | 7/1959 | Sedlacsik |
| 3,648,401 A | 3/1972 | Stains |
| 3,670,606 A | 6/1972 | Blomgren |
| 3,672,181 A | 6/1972 | Tyree |
| 3,734,412 A | 5/1973 | Haas |
| 3,747,284 A | 7/1973 | Lyczko |
| 3,862,391 A | 1/1975 | Blomgren |
| 3,971,114 A | 7/1976 | Dudley |
| 3,990,332 A | 11/1976 | Flom |
| 4,022,119 A | 5/1977 | Karr |
| 4,073,966 A | 2/1978 | Scholes |

(Continued)

FOREIGN PATENT DOCUMENTS

| | | |
|---|---|---|
| DE | 19903243 | 8/2000 |
| WO | WO01/74538 | 10/2001 |

OTHER PUBLICATIONS

U.S. Appl. No. 13/863,311, filed Apr. 15, 2013; U.S. Appl. No. 13/863,318, filed Apr. 15, 2013; for Particle Plasma Ablation Process; first inventor: Jackson.

(Continued)

*Primary Examiner* — Samuel M Heinrich
(74) *Attorney, Agent, or Firm* — Law Office of David Hong

(57) ABSTRACT

A method for simultaneously ablating and functionalizing a portion of a substrate surface, comprising the following steps: applying a CO2 particle spray against an unreacted portion of the substrate surface; and simultaneously projecting at least one source of ionizing-heating radiation into said CO2 particle spray flowing against said unreacted portion of the substrate surface, thus intersecting and mixing together to form an instantaneous surface treatment composition of ionizing-heating radiation and CO2 particle spray flowing against the substrate surface, and to form and remove a reacted portion of the substrate surface.

19 Claims, 19 Drawing Sheets

(56) References Cited

U.S. PATENT DOCUMENTS

| | | | |
|---|---|---|---|
| 4,341,347 | A | 7/1982 | DeVittorio |
| 4,645,977 | A * | 2/1987 | Kurokawa ............... C23C 16/26 |
| | | | 118/50.1 |
| 4,749,125 | A | 6/1988 | Escallon |
| 4,776,515 | A | 10/1988 | Michalchik |
| 4,829,859 | A | 5/1989 | Yankoff |
| 5,002,156 | A | 3/1991 | Gaunt |
| 5,056,720 | A | 10/1991 | Crum |
| 5,124,132 | A | 6/1992 | Francis |
| 5,231,851 | A | 8/1993 | Adolfsson |
| 5,312,598 | A | 5/1994 | Kersey |
| 5,333,640 | A | 8/1994 | Swift |
| 5,402,940 | A | 4/1995 | Haller |
| 5,409,418 | A | 4/1995 | Krone-Schmidt |
| 5,444,634 | A | 8/1995 | Goldman |
| 5,509,335 | A | 4/1996 | Emerson |
| 5,591,412 | A | 1/1997 | Jones |
| 5,592,863 | A | 1/1997 | Jaskowiak |
| 5,725,154 | A | 3/1998 | Jackson |
| 5,901,623 | A | 5/1999 | Hong |
| 6,066,032 | A * | 5/2000 | Borden et al. ................. 451/80 |
| 6,105,886 | A | 8/2000 | Hollstein |
| 6,206,764 | B1 | 3/2001 | Hsu |
| 6,312,569 | B1 * | 11/2001 | Suzuki ............... C23C 16/4401 |
| | | | 118/715 |
| 6,564,682 | B1 | 5/2003 | Zurecki |
| 6,656,017 | B2 | 12/2003 | Jackson |
| 6,764,385 | B2 * | 7/2004 | Boumerzoug et al. .......... 451/39 |
| 6,802,961 | B2 | 10/2004 | Jackson |
| 6,979,362 | B2 | 12/2005 | Jackson |
| 7,134,946 | B1 | 11/2006 | Jackson |
| 7,198,043 | B1 | 4/2007 | Zhang |
| 7,219,677 | B1 | 5/2007 | Jackson |
| 7,225,819 | B2 | 6/2007 | Jackson |
| 7,293,570 | B2 | 11/2007 | Jackson |
| 7,387,477 | B2 | 6/2008 | Usuki |
| 7,389,941 | B2 | 6/2008 | Jackson |
| 7,451,941 | B2 | 11/2008 | Jackson |
| 7,601,112 | B2 | 10/2009 | Jackson |
| 7,901,540 | B2 | 3/2011 | Jackson |
| 8,021,489 | B2 | 9/2011 | Jackson |
| 8,048,830 | B1 | 11/2011 | Jackson |
| 8,197,603 | B2 | 6/2012 | Jackson |
| 2002/0020691 | A1 | 2/2002 | Jewett |
| 2003/0207655 | A1 * | 11/2003 | Jackson ........................ 451/38 |
| 2004/0003828 | A1 | 1/2004 | Jackson |
| 2004/0087456 | A1 * | 5/2004 | Korzenski et al. ............ 510/175 |
| 2006/0278254 | A1 | 12/2006 | Jackson |
| 2007/0246064 | A1 | 10/2007 | Jackson |
| 2010/0170626 | A1 * | 7/2010 | Lochtman ............... B05D 1/00 |
| | | | 156/150 |
| 2012/0247504 | A1 * | 10/2012 | Nasr et al. ...................... 134/1.1 |
| 2014/0014138 | A1 * | 1/2014 | Spiegelman et al. ........... 134/31 |

OTHER PUBLICATIONS

Sharma, B., "Friction and Wear Behavior of Thioether Hydroxy Vegetable Oil", Sharma, B. et al, Tribology International 42 (2009) pp. 353-358.

Weinert, K., "Dry Machining and Minimum Quantity Lubrication", Weinert, K. et al, Annals CIRP, 53 2, 2004, pp. 511-537.

Wakabayashi, T., "The Role of Tribology in Environmentally Friendly MQL Machining." JTEKT.

Miura, T., "Structure Elucidation of Ozonated Olive Oil", Miura, T. et al, White Paper, College of Medical Technology, Hokkaido University.

John, J. Abstract for "Emulsions Containing Vegetable Oils for Cutting Fluid Application", John J. et al, University of Minnesota, Apr. 2004.

Rake, B., "Micro-Improvement:Advanced lubricants and nozzles improve fluid-mist systems", B. Rake, Cutting Tool Engineering, Apr. 2002, vol. 54, No. 4.

Accu-Lube Precision Lubricant Applicator, Installation and Operating Instructions, ITW Rocol North America.

Electrostatic Liquid Coating Technology, Website page print-out, http://www.terronics.com.

Landgraf, G., "Dry Goods: Factors to Consider when Dry or Near-dry Machining", Greg Landgraf, Cutting Tool Engineering, Jan. 2004, vol. 56, No. 1.

Aizawa, T., Abstract for "Self-Lubrication of Machining Tools in Dry via In-situ formed Tribofilms", T. Aizawa et al, Materials Research Society.

Mansoori, Y., "Esterfication of carboxylic acids by tributyl borate under solvent- and catalyst-free conditions", Green Chem., 2005, 7, 870-873.

Nakayama, K., "Plasma Generation in a Gap Around a Sliding Contact", Nakayama, K, et al, J.Phys. D: Appl. Phys., 35, (2002) L53-L56.

Gisip, J., "The effect of refrigerated air on tool wear in machining MDF", J. Gisip et al, Dept. of Forrest and Natural Resources, Purdue University.

Han, R., Abstract for "Experimental Investigation of the Effect of Ozone in Green Cutting", Han, R. et al, Key Engineering Materials, vol. 431-432, 2010, pp. 217-220.

Hadden, R., Abstract for "The adsorption and decomposition of carbon dioxide on polycrystalline copper", R. Hadden et al, Catalysis Letters, vol. 1, Nos. 1-3, Jan. 1988.

Wei, J., "Dry Lubricant Films for Aluminum Forming", Argonne National Laboratory, Wei, J. et al, ANL/ET/CP-98651, Oct. 1999.

Abstract for "Advanced Tooling Pays Off—Buying the latest tools costs more, but productivity payoffs worth the investment", Manufacturing Engineering, Dec. 2003, vol. 131, No. 6.

Brennan, J., "Five Facts about Diamond-Coated Tools", MoldMaking Technology Magazine, Apr. 2007.

Stanford, M., Abstract for "Investigation into the relationship between tool-wear and cutting environments when turning EN32 steel", M. Stanford et al, Industrial Lubrication and Tribology, vol. 56, No. 2, 2004, pp. 114-121.

PCT/US2005/044863; Jackson, D., "Carbon dioxide snow apparatus." Filed Dec. 13, 2005.

PCT/US2005/045180; Jackson, D. "Cryogenic fluid composition." Filed Dec. 13, 2005.

PCT/US2005/045122; Jackson, D. "Device for applying cryogenic composition and method of using same." Filed Dec. 13, 2005.

U.S. Appl. No. 11/301,466, filed Dec. 13, 2005 for "Cryogenic fluid composition." Jackson, D.

U.S. Appl. No. 11/301,441, filed Dec. 13, 2005 for "Device for applying cryogenic composition and method of using same." Jackson, D.

Vicray, R., et. al.; "Thermally Stable Lubricants from Vegetable Oils." Global Plastics Environmental Conference 2004:151-155; see website: http://sperecycling.org/sites/sperecycling.org/files/gpec/GPEC2004/papers/020.pdf.

U.S. Appl. No. 11/766,762, filed Jun. 21, 2007 for Method of Treatment a Substrate; first inventor: Jackson.

U.S. Appl. No. 11/425,087, filed Jun. 19, 2006 for Method for Selectively Treating a Substrate Surface; first inventor: Jackson.

U.S. Appl. No. 10/362,598, filed Jun. 13, 2003 for Surface Cleaning and Modification Processes, Methods and Apparatus Using Physicochemically; first inventor: Jackson.

U.S. Appl. No. 10/393,872, filed Mar. 21, 2003 for Precision Surface Treatment Using Dense Fluids and a Plasma; first inventor: Jackson.

U.S. Appl. No. 13/733,880, filed Jan. 3, 2013; U.S. Appl. No. 61/583,186, filed Jan. 5, 2012 for Method for forming and applying an oxgenated machining fluid; first inventor: Jackson.

U.S. Appl. No. 61/843,730, filed Jul. 8, 2013 for Method for Treating a Substrate Surface using Ozonated Solvent and Ultraviolet Light; first inventor: Jackson.

U.S. Appl. No. 61/843,751, filed Jul. 8, 2013 for Method and Apparatus for Cutting and Cleaning a Superhard Substrate; first inventor: Jackson.

U.S. Appl. No. 61/583,186, filed Jan. 5, 2012 for Method for Forming and Applying an Oxygenated Machining Fluid; first inventor: Jackson.

U.S. Appl. No. 61/583,190, filed Jan. 5, 2012 for Method and Apparatus for Cutting and Cleaning a Superhard Substrate; first inventor: Jackson.

(56) References Cited

OTHER PUBLICATIONS

U.S. Appl. No. 10/362,598, filed Jun. 13, 2003 for Surface Cleaning and Modification Processes . . . ; first inventor: Jackson.
U.S. Appl. No. 11/465,762, filed Aug. 18, 2006 for Dense Fluid Delivery Apparatus; first inventor: Jackson.
U.S. Appl. No. 11/271,725, filed Nov. 9, 2005 for Dense Fluid Cleaning . . . ; first inventor: Jackson.
U.S. Appl. No. 13/423,603, filed Mar. 19, 2012; U.S. Appl. No. 61/454,026, filed Mar. 18, 2011 for Method and Apparatus for Thermal Control within a Machining Process; first inventor: Jackson.
U.S. Appl. No. 11/465,775, filed Aug. 18, 2006 for Method and apparatus for treating a substrate with Dense Fluid and Plasma; first inventor: Jackson.
U.S. Appl. No. 10/433,833, filed Jun. 9, 2003 for Apparatus, Process and Method for Mounting and Treating a Substrate; first inventor: Jackson.
U.S. Appl. No. 10/343,734, filed Jan. 1, 2003 for Method and Apparatus for Supercritical Ozone treatment of a substrate; first inventor: Jackson.
U.S. Appl. No. 60/635,399, filed Dec. 13, 2004 for Method, process, chemistry and apparatus for selective thermal control, lubrication and post-cleaning a substrate; first inventor: Jackson.
U.S. Appl. No. 60/635,230, filed Dec. 13, 2004 for Method and app. for selectively treating a substrate using cryogenic sprays; first inventor: Jackson.
U.S. Appl. No. 10/221,593, filed Sep. 12, 2002 for dense fluid spray cleaning process and apparatus; first inventor: Jackson.
U.S. Appl. No. 08/516,530, filed Aug. 18, 1995 for dense fluid spray cleaning process and apparatus; first inventor: Jackson.
U.S. Appl. No. 10/221,767, filed Mar. 13, 2001 for dense fluid cleaning centrifugal phase shilling separation process and apparatus; first inventor: Jackson.
U.S. Appl. No. 10/476,108, filed Oct. 24, 2003 for apparatus and process for the treatment, delivery and recycle of process fluids . . . ; first inventor: Jackson.
U.S. Appl. No. 13/016,836, filed Jan. 28, 2011 for substrate treatment process; first inventor: Jackson.
U.S. Appl. No. 10/428,793, filed May 2, 2003 for Method and Apparatus for Selective Treatment of a Precision Substrate Surface; first inventor: Jackson.
U.S. Appl. No. 10/393,872, filed Mar. 21, 2003 for Precision Surface Treats Using Dense Fluids and a Plasma; first inventor: Jackson.
U.S. Appl. No. 13/863,311, filed Apr. 14, 2013 for Particle-Plasma Ablation Process; inventors: Jackson and Endres.
U.S. Appl. No. 61/820,524, filed May 7, 2013 for Photomechanical Machining Method for a Dielectric Cutting System; first inventor: Jackson.
U.S. Appl. No. 61/836,636, for Det. of Composition and Structure of a CO2 Composite Spray; first inventor: Jackson.
U.S. Appl. No. 61/836,635 for CO2 Composite Spray Method and Apparatus; first inventor: Jackson.
U.S. Appl. No. 61/624,322, filed on Apr. 15, 2012; U.S. Appl. No. 13/863,311, filed Apr. 15, 2013 for Particle-Plasma Abelation Process; Inventors: Jackson and Endres.
U.S. Appl. No. 13/863,318, filed Apr. 15, 2013 for Particle-Plasma Abelation Process; Inventors: Jackson and Endres.
U.S. Appl. No. 14/307,488, filed Jun. 17, 2014; U.S. Appl. No. 61/836,635, filed Jun. 18, 2013; U.S. Appl. No. 61/836,636, filed Jun. 18, 2013 for CO2 Composite Spray Method and Apparatus; Inventors: Jackson, et. al.
U.S. Appl. No. 14/308,697, filed Jun. 18, 2014; U.S. Appl. No. 61/836,635, filed Jun. 18, 2013; U.S. Appl. No. 61/836,636, filed Jun. 18, 2013 for Det. of Composition and Structure of CO2 Composite Spray; Inventors: Jackson, et. al.
PCT/US2014/043046, filed on Jun. 18, 2014 for Method and Apparatus for Forming and Regulating a CO2 Composite Spray; Inventor: Jackson, et al.
U.S. Appl. No. 14/325,278, filed Jul. 7, 2014 for Method for Treating a Substrate Surface Using Ozonated Solvent and Ultraviolet Light; Inventor: Jackson; U.S. Appl. No. 61/843,730, filed Jul. 8, 2013.
U.S. Appl. No. 14/335,875, filed on Jul. 18, 2014 for Method and Appraatus for Cutting and Cleaning a Superhard Substrate; Inventor: Jackson.
Aronson, R.,"Using High-Pressure Fluids", Manufacturing Engineering, Jun. 2004, vol. 132, No. 6; http://www.sme.org/MEMagazine/Article.aspx?id=37402&taxid=1416.
Kubie, L., "The Solubility of O2, CO2, and N2 in Mineral Oil and the Transfer of Carbon Dioxide from Oil to Air," Jan. 1927.
Hobbie, M., "Disintegration of Liquid Phases in Pressurized Gases—Influence of Mass Transfer", ILASS Europe 2002, Zaragoza 9, Sep. 11, 2002.
Rainey, K.N.,"Effect of Pressure, Subcooling, and Dissolved Gas on Pool Boiling Heat Transfer From Microporous Surfaces in FC-72", Int'l Journal of Heat and Mass Transfer, Jan. 2003, vol. 46(1): 23-35.
Schey, J., Tribology in Metalworking—Friction, Lubrication and Wear, American Society for Metals, 1983, pp. 624-625.
Veillette, M., Abstract for "Six Month Tracking of Microbial Growth in a Metalworking Fluid after System Cleaning and Recharging", M. Veillette et al., Am. Occup. Hyg., vol. 48, No. 6, pp. 541-546, 2004.
U.S. Food and Drug Administration, Kinetics of Microbial Inactivation for Alternative Food Processing Technologies—High Pressure Processing, U.S. Food and Drug Administration, Center for Food Safety and Applied Nutrition, Jun. 2, 2000.
Hendershot, R., "Use of Oxygen to Improve Combustion and Oxidation", Hendershot, R et al, Chemical Engineering Progress, Jul. 2010.
Fox, G., Self-Organization During Friction—Advanced Surface-Engineered Materials and Systems Design, German S. Fox-Rabinovich et al, CRC Taylor and Francis Group, 2007.
Buckley, D., "The Role of the Micro Environment on the Tribological Behavior of Materials", Buckley, D., NASA Technical Memorandum 81434, NASA-TM-81434, NASA Lewis Research Center, Cleveland, Ohio, 1980.
Rakovsky, S., "Fields of Ozone Applications", Rakovsky, S et al, Chemistry and Chemical Technology, vol. 3, No. 2, 2009.
Nguyen, T., "An Assessment of the Applicability of Cold Air and Oil Mist in Surface Grinding", Nguyen, T. et al, Journal of Materials Processing Technology, 140 (2003), pp. 224-230.
Han, R., Abstract for "Experimental Investigation of the Effect of Ozone in Green Cutting", Han R. et al, Key Engineering Materials, vols. 431-432 2010) pp. 217-220.

\* cited by examiner

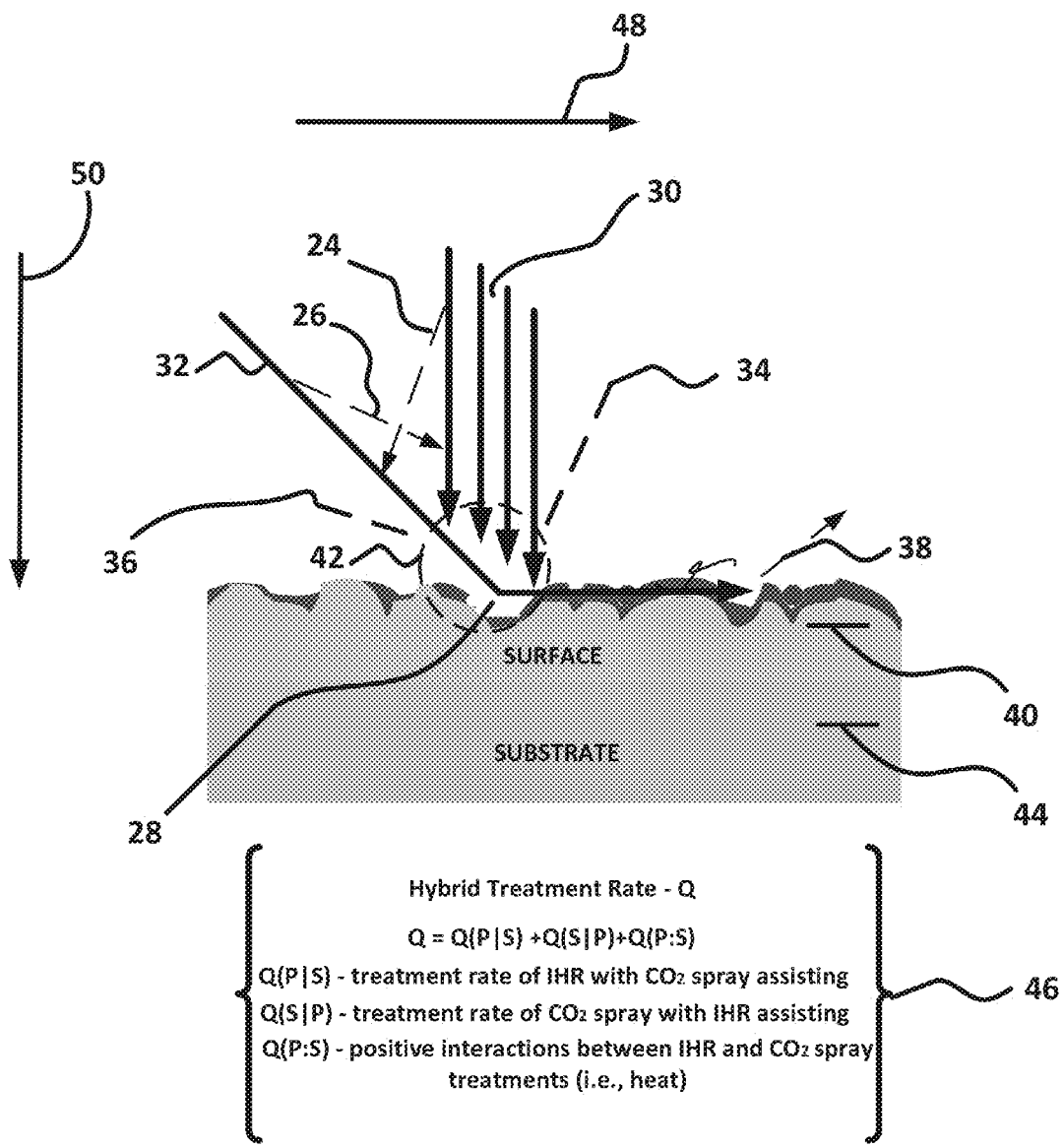

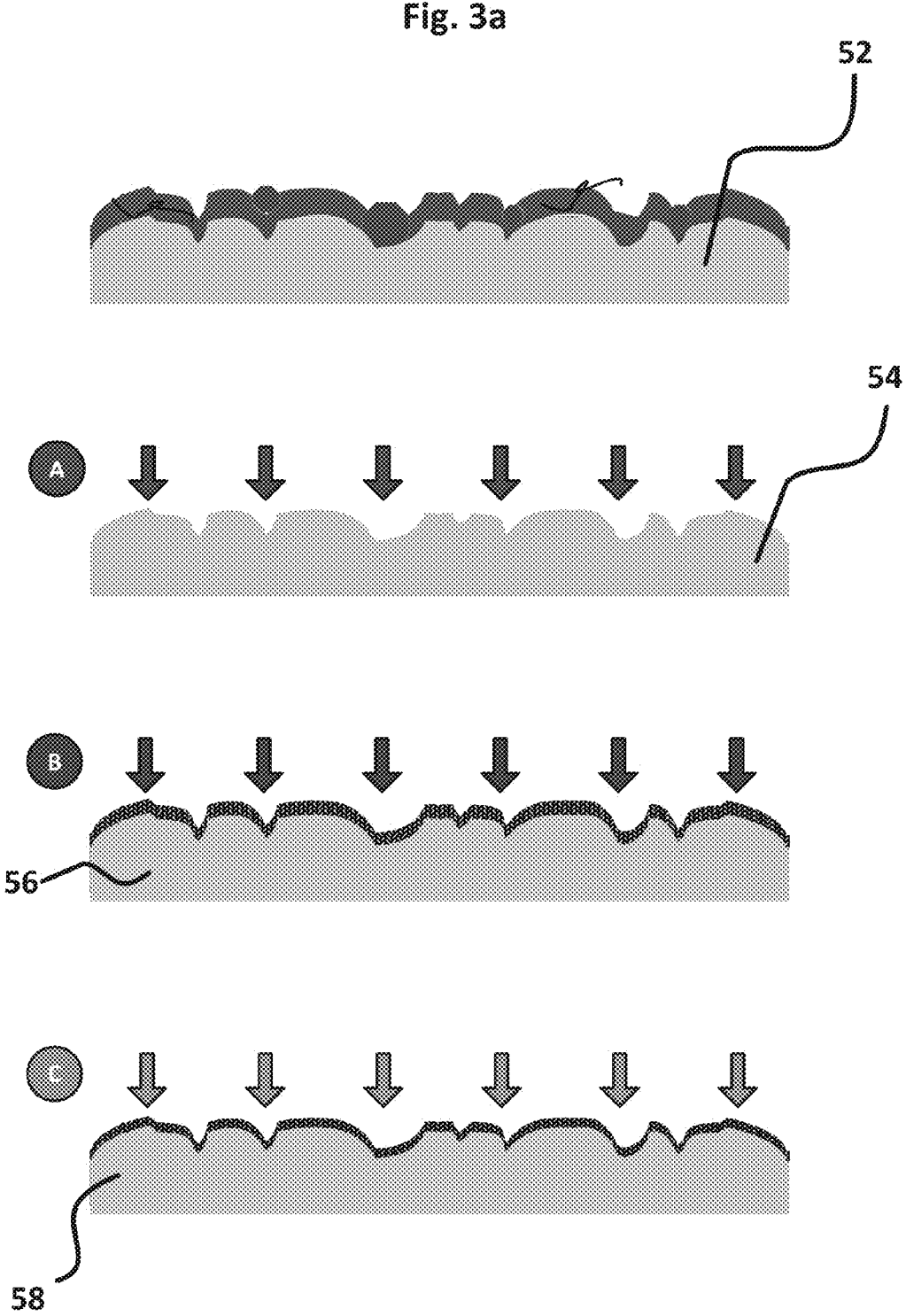

Fig. 3b

Particle-Plasma Treatment Process Metrics

60 — Propellant:
Type: Nitrogen Gas
Pressure: 80 psi (552 kPa)
Temperature: 120° C (393 K)

62 — Particle Generation:
Cap. Diameter (I.D.): 0.030 inches (8 mm)
Cap. Length: 8 feet (244 cm)
Applicator Nozzle: Coaxial
Spray Angle: 45 Degrees into Surface 64 — Plasma Generation:
Treatment Gas: Carbon Dioxide
Type: Blown Ion
Spray Pressure: 80 psi (552 kPa)
Spray Angle: 90 Degrees into Surface (through Particle Spray)

66 — Robot/Hybrid Treatment Applicator:
Robot Type: Cartesian, 3-axis
Treatment Scan Rate: 10 mm/sec (adjustable)
Treatment Sequence: Plasma-through-Particle Stream
Distance from surface: 1.27 cm (adjustable)

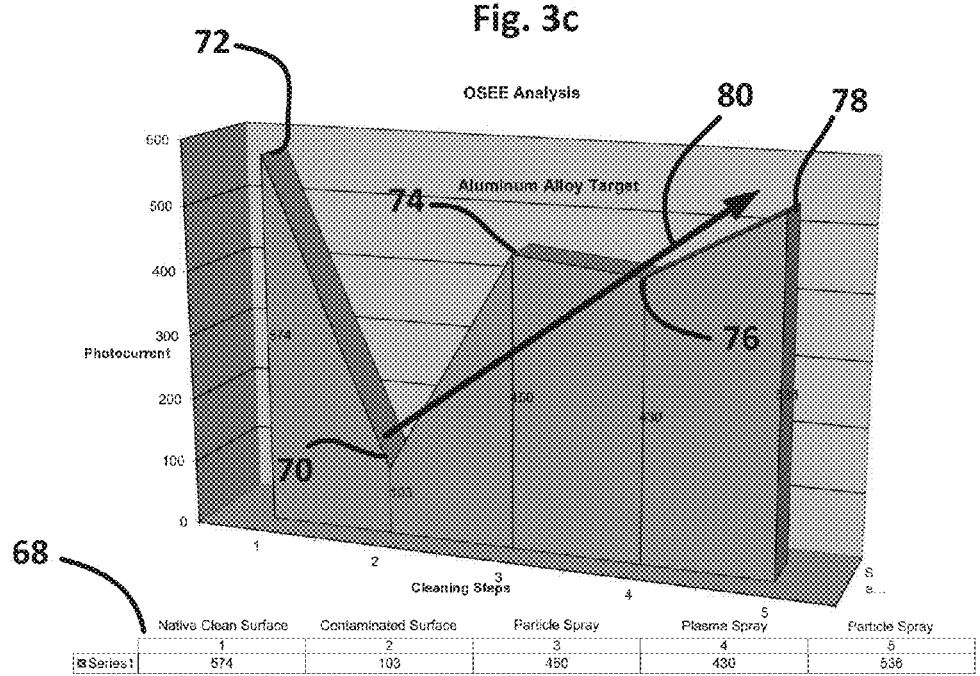

Fig. 3c

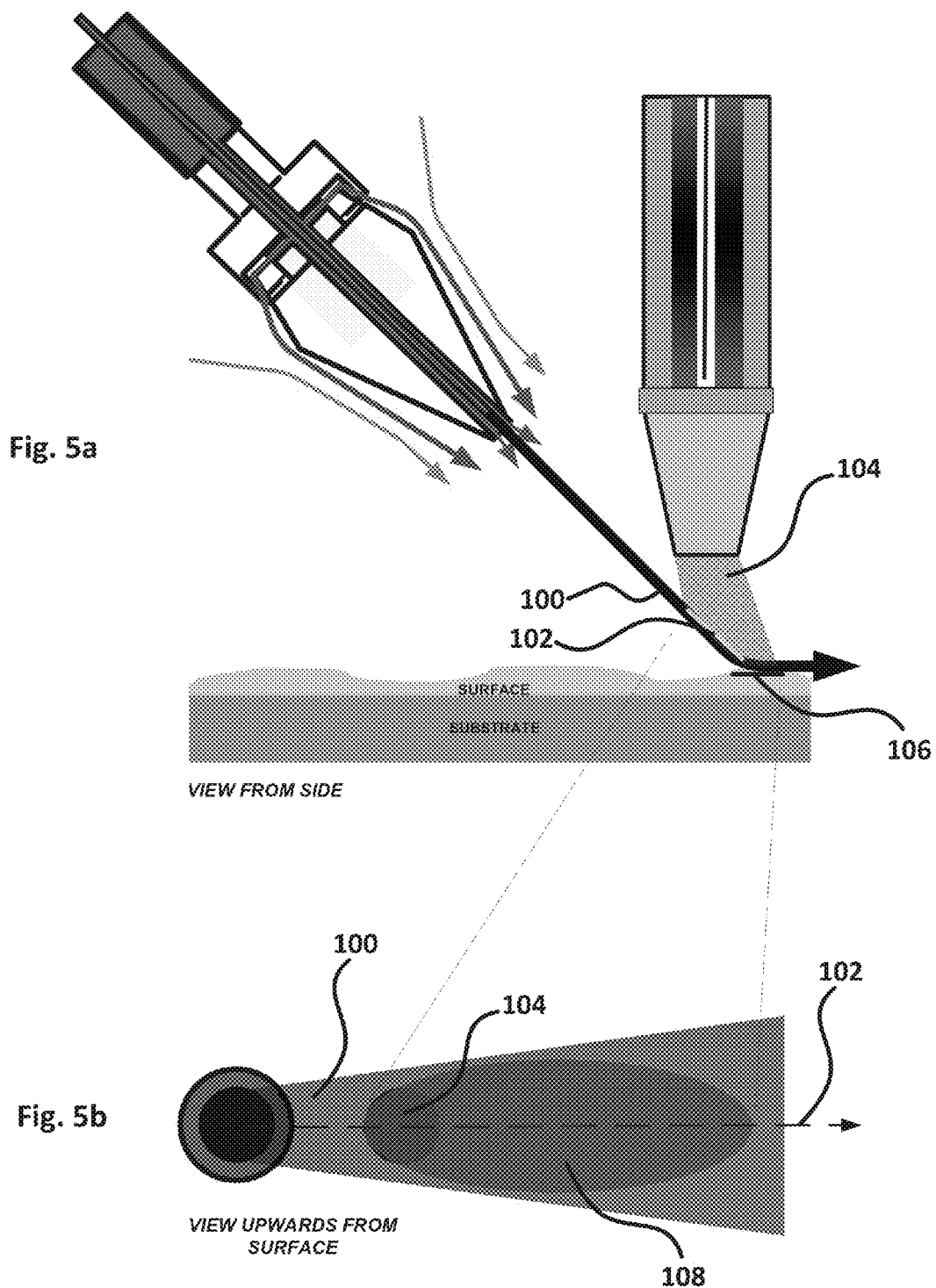

Fig. 8a
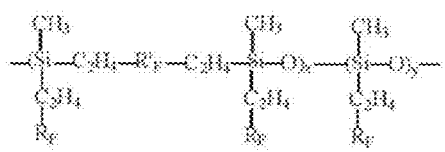
FLUOROSILICONE RUBBER (FSR)
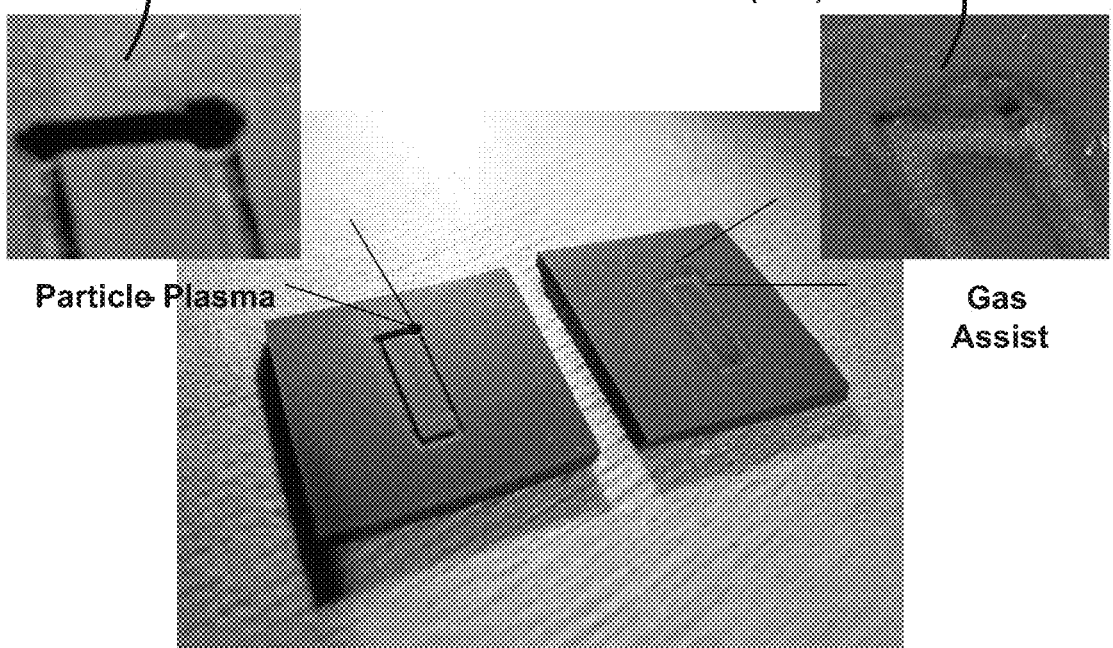
Fluorosilicone rubber milled using an Diode Laser with a 60 Watt power source and operating at a wavelength of approximately 940 nm.

Butyl Rubber milled using an Diode Laser with a 60 Watt power source and operating at a wavelength of approximately 940 nm.

Fig. 10a

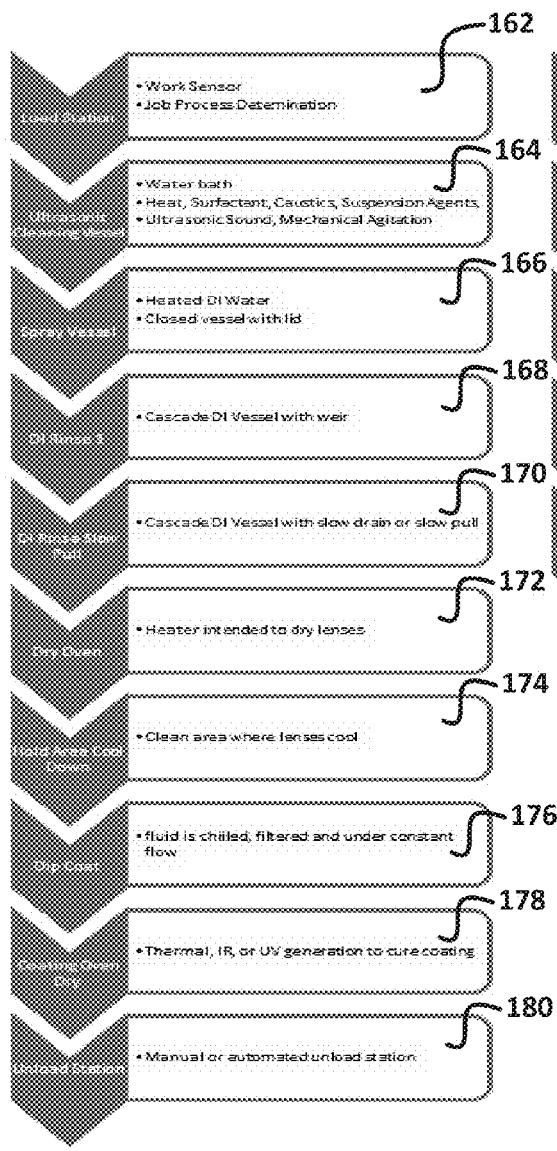

- 162 • Work Sensor
  • Job Process Determination
- 164 • Water bath
  • Heat, Surfactant, Caustics, Suspension Agents
  • Ultrasonic Sound, Mechanical Agitation
- 166 • Heated DI Water
  • Closed vessel with lid
- 168 • Cascade DI Vessel with weir
- 170 • Cascade DI Vessel with slow drain or slow pull
- 172 • Heater intended to dry lenses
- 174 • Clean area where lenses cool
- 176 • fluid is chilled, filtered and under constant flow
- 178 • Thermal, IR, or UV generation to cure coating
- 180 • Manual or automated unload station

Fig. 10b

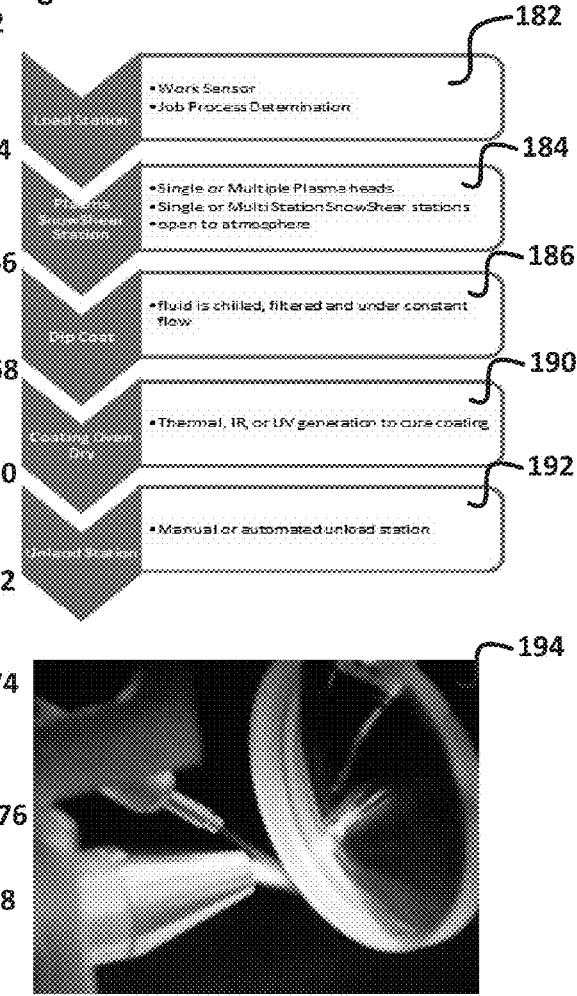

- 182 • Work Sensor
  • Job Process Determination
- 184 • Single or Multiple Plasma heads
  • Single or Multi Station SnowShear stations
  • open to atmosphere
- 186 • fluid is chilled, filtered and under constant flow
- 190 • Thermal, IR, or UV generation to cure coating
- 192 • Manual or automated unload station

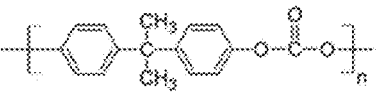

Polycarbonate (PC) — 196

Front side mechanical center test results examples on mixed substrates

| Sample # | Particle-Plasma Cycle 1 | | | Particle-Plasma Cycle 2 | | | Particle-Plasma Cycle 3 | | |
|---|---|---|---|---|---|---|---|---|---|
| | a | b | c | a | b | c | a | b | c |
| 1 | 5 | 5 | 5 | 5 | 5 | 5 | 5 | 5 | 5 |
| 2 | 5 | 5 | 5 | 5 | 5 | 5 | 5 | 5 | 5 |
| 3 | 5 | 5 | 5 | 5 | 5 | 5 | 5 | 5 | 5 |
| 4 | 5 | 5 | 5 | 5 | 5 | 5 | 5 | 5 | 5 |
| 5 | 5 | 5 | 5 | 5 | 5 | 5 | 5 | 5 | 5 |
| 6 | 5 | 5 | 5 | 5 | 5 | 5 | 5 | 5 | 5 |
| 7 | 5 | 5 | 5 | 5 | 5 | 5 | 5 | 5 | 5 |
| 8 | 5 | 5 | 5 | 5 | 5 | 5 | 5 | 5 | 5 |
| 9 | 5 | 5 | 5 | 5 | 5 | 5 | 5 | 5 | 5 |
| 10 | 5 | 5 | 5 | 5 | 5 | 5 | 5 | 5 | 5 |
| 11 | 5 | 5 | 5 | 5 | 5 | 5 | 5 | 5 | 5 |
| 12 | 5 | 5 | 5 | 5 | 5 | 5 | 5 | 5 | 5 |
| 13 | 5 | 5 | 5 | 5 | 5 | 5 | 5 | 5 | 5 |
| 14 | 5 | 5 | 5 | 5 | 5 | 5 | 5 | 5 | 5 |
| 15 | 5 | 5 | 5 | 5 | 5 | 5 | 5 | 5 | 5 |
| 16 | 5 | 5 | 5 | 5 | 5 | 5 | 5 | 5 | 5 |
| 17 | 5 | 5 | 5 | 5 | 5 | 5 | 5 | 5 | 5 |
| 18 | 5 | 5 | 5 | 5 | 5 | 5 | 5 | 5 | 5 |
| 19 | 5 | 5 | 5 | 5 | 5 | 5 | 5 | 5 | 5 |
| 20 | 5 | 5 | 5 | 5 | 5 | 5 | 5 | 5 | 5 |
| 21 | 5 | 5 | 5 | 5 | 5 | 5 | 5 | 5 | 5 |
| 22 | 5 | 5 | 5 | 5 | 5 | 5 | 5 | 5 | 5 |
| 23 | 5 | 5 | 5 | 5 | 5 | 5 | 5 | 5 | 5 |
| 24 | 5 | 5 | 5 | 5 | 5 | 5 | 5 | 5 | 5 |
| 25 | 5 | 5 | 5 | 5 | 5 | 5 | 5 | 5 | 5 |
| 26 | 5 | 5 | 5 | 5 | 5 | 5 | 5 | 5 | 5 |
| 27 | 5 | 5 | 5 | 5 | 5 | 5 | 5 | 5 | 5 |
| 28 | 5 | 5 | 5 | 5 | 5 | 5 | 5 | 5 | 5 |
| 29 | 5 | 5 | 5 | 5 | 5 | 5 | 5 | 5 | 5 |
| 30 | 5 | 5 | 5 | 5 | 5 | 5 | 5 | 5 | 5 |

TEST RESULT DESCRIPTONS

| Column A - Crazing | Column B - Delamination | Column C - Crosshatch Area |
|---|---|---|
| A5 No crazing | B5 No delamination (0%) | D5 No peeling |
| A4 Hairline crazing | B4 Partial Individual layers (25%) | D4 Some Peeling (5%) |
| A3 Hairline (25%) | B3 Partial Individual Layers (75%) | D3 Peeling (15%) |
| A2 Hairline (75%) | B2 Total Delamination (100%) | D2 Peeling (35%) |
| A1 Hairline (100%) | | D1 Peeling (65%) |
| A0 Severe (100%) | | D0 Peeling (100%) |

PARTICLE-PLASMA ABLATION PROCESS

PRIORITY CLAIM

This application claims the benefit of U.S. Provisional Patent Application No. 61/624,322, filed on Apr. 15, 2012, which is incorporated by reference in entirety.

BACKGROUND OF THE INVENTION

Manufacturing process tools such as ultraviolet (UV) Laser, near-infrared (NIR) Laser, and infrared (IR) Laser and Blown Ion Plasma, Corona Plasma, Radiofrequency (RF), Pulsed Xenon (Xe) Flash Lamps, and Intense IR Flash Light; all utilize intense photon- and/or electron (i.e., strong photonic and/or electromagnetic field) driven processes to precisely remove (i.e., chemically, mechanically and thermally ablate) top-most surfaces of a variety of organic, inorganic and composite substrates during the production and assembly of high reliability and precision products such as ophthalmic lenses, optical filters, microfluidic devices, medical components, aerospace devices, and many others. The processes employed in these manufacturing tools are collectively termed herein as ionizing-heating radiation or IHR.

IHR technologies share common process control constraints including excessive localized surface heating, melting, deflagration, discoloration, decomposition, and excessive surface particle and film debris generation in regions surrounding and within the contact interface between the IHR beam and/or plume with the substrate surface—referred to as the Heat Affected Zone or HAZ. This is particularly the case for the processing of organic substrates such as polymers, composites, fibers, and skin tissue. Energetic interactions between organic surfaces and IHR beam or plume radiation, electrons, electromagnetic fields, ions, oxidizing gases, and radicals produce plasma-like reactions on the surface which, as a by-product, produce excessive heat, particle, and film contaminations.

Typically, air or gas assist is employed with IHR processes. For Laser processing, an air or nitrogen blow-off gas is used to assist the Laser beam with removal of both heat and ablation debris. For atmospheric corona plasma or blown ion processing, pressurized gas is used to create both reactive ions. An electrified ion delivery plume, called Blown Ion Plasma, delivers the beneficial treatment agents (and hot gases). Atmospheric plasma plumes are typically very hot and cannot be in contact with delicate polymeric substrates containing microscopic surface features for more than fractions of a second. Atmospheric corona plasma or blown ion plume temperatures employing $CO_2$ gas (a preferred atmospheric corona plasma or blown ion fluid in the present invention) exceed the softening or melting point of many common thermoplastics. Gas-assisted IHR processes provide limited cooling capacity in the case of Laser processes, or no cooling capacity in the case of atmospheric corona plasma or blown ion processes.

Moreover, both Laser and AP processing produces surface contaminants as by-products. Heat, radical and UV light generated by-products include, for example, oxidized particles, loosely bound surface layers, and decomposition residues. As such, conventional IHR processes are self-contaminating and do not clean-up after themselves. Mitigation procedures such as using lower IHR energy levels (power/pulse) or performing faster and repeated surface scans to offset deleterious heating affects only slows down material processing rates. As such, conventional IHR-processed substrates typically endure a post-precision cleaning process to achieve adequate cleanliness prior to the next fabrication step. In fact, U.S. Pat. Nos. 5,725,154 and 7,451,941 (exemplary $CO_2$ treatment sprays) developed by the first-named inventor of the present invention has been used to perform this type of secondary precision cleaning operation on IHR-processed polymeric substrates, described herein, and U.S. Pat. Nos. 5,725,154 and 7,451,941 are both incorporated by reference herein. A "$CO_2$ Composite Spray™" (a trademark of CleanLogix LLC, Valencia, Calif.) is an adjustable $CO_2$ particle-fluid jet that is very distinct in form and function from conventional "$CO_2$ Snow" jets which have no compositional or physical control. A $CO_2$ Composite Spray can be controlled to form various sizes of dry ice particles, control particle-fluid concentration, and compose different particle-fluid chemistries and concentrations, as well as control spray pressures and temperatures using a variety of propellant fluids and additives including, but not limited to, clean dry air (CDA), nitrogen, argon, hydrocarbons, volatile methyl siloxanes, and many other possibilities. The distinct capabilities and operational characteristics of CO2 Composite Spray devices suitable for use with the present invention are described in U.S. Pat. Nos. '154 and '941.

The first-named inventor of the present invention has also developed a prior art hybrid surface treatment apparatus and method that addresses various constraints of a particular IHR technology called corona plasma discharge. U.S. Pat. Nos. 7,901,540 and 8,021,489, which are both incorporated by reference herein, describe a coaxial plasma-$CO_2$ spray generator apparatus and method to simultaneously form and apply a corona plasma stream and cleaning particle stream to a substrate surface. The hybrid system of the '540 invention is different in configuration from the present invention; namely it generates both treatment streams internally within a coaxial apparatus and mixes the two streams in the atmosphere immediately exiting the hybrid device spray nozzle ('540, FIG. 3, 124); delivering the resulting composition to the substrate surface below. The '540 invention presents difficulties with regards to being able to independently balance the RF corona plasma power with the $CO_2$ spray composition, particularly when higher plasma power is desired (i.e., increased ion generation). This is required to increase plasma surface treatment rates on the substrate surfaces. Using high-power plasma requires a richer (higher $CO_2$ particle concentration) $CO_2$ Composite Spray to compensate for higher mixing temperatures to prevent premature sublimation of beneficial $CO_2$ cleaning particles. Moreover, the beneficial surface heating derived from the plasma is diminished with higher $CO_2$ particle concentrations. Still moreover, this technique is not useful for removing (ablating) significant amounts of surface material and contaminants thereon in a short period of time.

An alternative hybrid treatment process is needed that can provide more independent treatment stream control, higher IHR operating powers and increased productivity. For example a conventional blown ion plasma system using $CO_2$ gas operates at much higher powers and temperatures, and offers much faster micro-etching rates, but requires significantly improved management of both heat and surface debris contaminant generation to be particularly useful for processing soft or thin substrates such as polymers and composites, as well as other types of challenging substrate materials and geometries discussed herein. Moreover and as described above, IHR manufacturing technology such as Laser, RF Ablation, and Intense IR light also require effective substrate cooling and surface cleaning to provide effective solutions for processing soft substrates.

It has been discovered by the present inventors that mixing a $CO_2$ Composite Spray with a conventional high-powered IHR beam or plume, such as a $CO_2$ Laser beam or an atmospheric blown ion plasma plume, at a precise shearing angle between the IHR beam or plume and the substrate surface, and onto the same surface portion affords advantageous results as compared to prior art gas-assisted and $CO_2$-assisted hybrid surface treatment processes described above. This is particularly the case for the treatment of soft substrate surfaces such as polymers and composites requiring faster and more aggressive surface treatments (at high speed) such as microetching and micromachining. Rather than an expected annihilation or attenuation of the beam or plume functions at the contact point, the $CO_2$ particle stream was found to assist a NIR Laser beam with machining processes and to assist Blown Ion plasma with microetching processes. The resulting new hybrid processes deliver more powerful and effective surface treatment energy (i.e., cleaning agents, etching agents, heat, etc.) through better IHR process optimization and control. The heating and ionizing radiations pass directly through the $CO_2$ Composite Spray into the substrate surface using the novel hybrid spray method herein. The $CO_2$ Composite Spray behaves uniquely in the present invention as a prophylactic particle fluid that cleans and cools while allowing the IHR UV and IR radiation to interact freely with the substrate surface below due to carbon dioxide's advantageous electromagnetic radiation adsorption properties. In the present invention, the present inventors believe that any variety of high-powered IHR devices can be integrated with a $CO_2$ Composite Spray and employed using the novel process described herein. For example, another exemplary hybrid surface treatment process that has been developed using the present invention is NIR and IR Laser technology for micromachining applications.

Finally, the present invention is a cost- and performance-effective alternative to "wet" processes such as organic solvents, and aqueous and semi-aqueous, alkaline and acidic cleaning and etching chemistries to prepare surfaces for coating, bonding, underfilling, and many other applications requiring improved surface adhesion properties. The present invention resolves the constraints of conventional surface preparation and modification technology described above and is summarized below.

SUMMARY OF THE INVENTION

The present invention is a new hybrid manufacturing process, which the present inventors term "Particle-Plasma Ablation". Particle-Plasma Ablation simultaneously combines or hybridizes the synergetic effects of an atmospheric ionizing-heating radiation (IHR) device; preferably a Laser beam (ultraviolet (UV), near-infrared (NIR) or infrared (IR)) and/or Atmospheric Plasma (AP), or both, with a $CO_2$ Composite Spray system to precisely process a substrate surface; the surface treatment being both chemical and physical in nature ranging from a mild uniform etching and functionalization action (i.e., in preparation for coating and bonding operations) to precise surface material removal (i.e., machining), or both. For example, the present invention can be used to provide precision surface machining of microfluidic devices on a polycarbonate substrate (using Laser-powered Particle-Plasma Ablation) and surface etching and modification using (AP-powered Particle-Plasma ablation) for solvent, adhesive or thermal bonding operations to produce a complete, fabricated microfluidic system.

More specifically, at nominal atmospheric pressure, preferred IHR beams and plumes are projected into and through a $CO_2$ Composite Spray which itself is projected toward and flowing against the same portion of a substrate surface, defined as the intersection of external IHR and $CO_2$ spray constituents on the same portion of substrate surface. A $CO_2$ Composite Spray—an adjustable $CO_2$ particle-fluid jet—is very distinct in form and function from conventional "$CO_2$ Snow" jets which have no compositional or physical control. A $CO_2$ Composite Spray can be controlled to form various sizes of dry ice particles, control their concentration, and compose different particle-fluid chemistries, concentrations, spray pressures and temperatures using a variety of propellant fluids and additives possibilities including, but not limited to, clean dry air (CDA), nitrogen, argon, hydrocarbons, siloxanes and many others. This particular form of $CO_2$ spray jet capability comprises the particle-fluid component of the present invention. The energetic photonic or electronic beams and plumes of IHR devices induce heating, cracking, fracturing, chemical modification, decomposition, ionization and other energetic phenomena at the topmost surface layers, collectively referred herein as surface plasma reactions. These surface disruptions comprise the surface plasma reaction aspect of the present invention that generates the need for vectoring surface plasma debris from reaction sites, including excess reaction heat contamination generated within the surface reaction zone or heat-affected zone. Vectoring can also mean removing or removing with a force. A unique aspect of the present invention is that a $CO_2$ Composite Spray is transparent to the photonic and electromagnetic energies common to both UV/NIR/IR Laser and AP beams and plumes, and contributes two distinct and advantageous capabilities—adjustable cooling capacity and surface cleaning actions. This allows the beneficial radiations to transmit freely though the $CO_2$ particle-fluid stream and to the surface while the $CO_2$ stream performs needed thermal control and cleaning actions for same. $CO_2$ Composite Spray capabilities used in cooperation with IHR processes effectively mitigate surface overheating, material ignition, non-uniform treatment, localized melting of surface features (i.e., micromachined channels, sharp edges and features), charring or discoloration common to conventional Laser and AP processing of polymers. Moreover, beneficial ions, radicals and reactants such as ozone gas (common to AP-powered Particle-Plasma ablation processes of the present invention) are preserved and their surface treatment functions enhanced. For example, reactive by-products of an AP plume are incorporated into a $CO_2$ Composite Spray (condensed onto $CO_2$ particles and vortically mixed into the jet stream) are more energetically delivered to the surface through very high shear stresses (controllable up to 60 MPa) and unique phase change (solid→liquid) scouring-washing action during $CO_2$ particle-surface impacts. Still another unique aspect of the present invention is that the energetic and electrically conductive nature of plasma present at the particle contact surface mitigates tribocharging (contact electrification and charging); a common phenomenon associated with dielectric sprays such as a $CO_2$ Composite Spray. This is a major advantage for processing substrates surfaces which are themselves, or contain microscopic structures or components thereon, sensitive to electrostatic discharge or electrical overstress. Finally, the exemplary $CO_2$ Composite Spray used in the present invention delivers its particle-fluid stream to the substrate surface as a vortically-mixed stream. The vortical mixing characteristics of this exemplary (and preferred) $CO_2$ particle spray drives the rapid incorporation of beneficial IHR components such as ozone, oxygen radicals and ions, as well as deleterious excess IHR fluid heat (i.e., blown ion plasma plume), into the $CO_2$ fluid stream, and which is delivered as an energetic composition to the substrate surface.

In another aspect of the present invention, a $CO_2$ Composite Spray is used to control the temperature of the same portion of surface that the IHR is acting upon. Heretofore, dilute particle-in-fluid thermal control as taught herein has not been used to mitigate surface heat for ionizing-heating radiation processes such as atmospheric plasma and laser, among others, evidenced by an absence of prior art in this regard. Compositional control and electromagnetic adsorption properties of a $CO_2$ Composite Spray uniquely resolve surface heating constraints associated with conventional IHR technology. This can be better understood and appreciated by comparing conventional dense $CO_2$ Snow Jets to a $CO_2$ Composite Spray, summarized below. Conventional $CO_2$ Snow Jets utilize DeLaval-type (convergent-divergent) spray nozzles. With regards to the present invention, the main disadvantages of DeLaval cryogenic spray nozzles are lack of compositional control—particle size, particle-fluid ratios, particle velocities and no additional chemistry control. A conventional $CO_2$ Snow Jet produces a dense, high pressure and very low temperature spray (−105 Deg. F). Conventional $CO_2$ spray cleaning (and thermal control) processes complicate the design and manufacture of automated systems. For example in order to utilize conventional $CO_2$ spray designs with IHR automation, abatement measures to control substrate temperature and the introduction of condensed water would have to be implemented to remove or alter the humidity, particles and other contaminants present in the ambient atmosphere in the vicinity of the surface treatment area. These measures would include, for example, an inert gas-purged environmental chamber or tunnel, hot plates, infrared (IR) heat lamp, and/or hot gas purging streams. All of these measures add complexity and cost to the final automated IHR system design, if at all practical.

A more recent $CO_2$ spray cleaning improvement which addresses many of the shortcomings of conventional $CO_2$ Snow Jet spray systems in general and the DeLaval $CO_2$ spray nozzle design in particular, is called a $CO_2$ Composite Spray™, a trademark of CleanLogix LLC, and developed by the first-named inventor herein (U.S. Pat. No. '154). A $CO_2$ Composite Spray is generated preferably using Coaxial or Coaxial-Coanda two-phase composite spray nozzle designs with integrated capillary condensers. Coaxial composite sprays efficiently produce cleaning and/or cooling sprays containing solid $CO_2$ particles (i.e., the cleaning and cooling agent) of controllable size, density, concentration, heat capacity and kinetic energy. To make solid carbon dioxide particles, a capillary condenser assembly comprising an elongated segment of thermally-insulated polyetheretherketone (PEEK) capillary tubing is used. A capillary condenser assembly provides an efficient means for subcooling (boiling) and condensing small amounts of liquid carbon dioxide into a low velocity but dense mass of solid-phase particles. Varying the length and internal diameter(s) of the capillary condenser, including stepping, produces particles having different particle size distribution ranges and density. Once formed, $CO_2$ particles are injected and vortically mixed into a temperature-controlled propellant gas such as nitrogen or clean-dry air (optionally ionized), which flows coaxially with the capillary condenser assembly. Besides unique spray generation and composition characteristics, there are a number of other unique aspects of a $CO_2$ Composite Spray. These aspects include both physical and chemical properties detailed in above-referenced inventions, as well as numerous papers, by the first named inventor.

Still moreover, the exemplary Laser- and AP-powered particle-plasma processes thus described may be combined to form a unique hybrid comprising three processes simultaneously; Laser, AP and $CO_2$ Composite Spray. This type of hybrid process can provide complete surface machining, micro-etching for bonding, and precision cleaning capability for the fabrication and assembly of microfluidic devices.

With regards to a Laser-powered Particle-Plasma Ablation process, a $CO_2$ Composite Spray contacts the same portion of surface as the Laser beam. A $CO_2$ Composite Spray is transparent to the Laser beam, acting only on the same portion of the surface as the Laser beam to control surface temperature and to instantly removes Laser processing by-products as they are produced. With regards to an AP-powered Particle-Plasma Ablation process, the present invention uniquely shears the blown ion plume, spreading the plume across a thin, vortexing $CO_2$ particle fluid field which incorporates and sustains beneficial treatment agents from the AP plume while quenching hot gas by-products therein. Beneficial cleaning and etching agents such as ozone gas cool and condense onto cold $CO_2$ particles and are vortically mixed into the plasma-doped $CO_2$ fluid stream—and delivered energetically into the contacting surface as an ozonated liquid carbon dioxide fluid. The UV and IR heating radiation derived from the AP plume transmit freely through the $CO_2$ particle fluid stream, reaching the surface to assist with surface micro-ablation and functionalization reactions.

Still moreover, hybridized IHR beam/plume and $CO_2$ particle/fluid treatment compositions are instantly formed and used in cooperation in space and on the same portion of a substrate surface to perform cleaning, etching, and surface ablation actions which are superior to those performed by any of the aforementioned surface treatment processes used alone; Laser, AP or $CO_2$ powered processes. As an example, depending upon the propellant gas and additive chemistries (if any) present in the $CO_2$ Composite Spray, different types of surface reactions, rates and modifications can be performed in cooperation with the IHR beams and plumes. The present invention provides faster IHR processing with cleaner surfaces and more uniform surface treatments.

In all Particle-Plasma ablation implementation schemes thus described, fluids may be added to the $CO_2$ Composite Spray, vortically mixed, and delivered into the IHR-powered surface plasma reactions to beneficially change performance aspects of the hybrid surface treatment. For example, fluids such as oxygen gas, ozone gas, nitrogen gas, argon gas, hydrocarbons, and many other possible additives may be incorporated into a $CO_2$ Composite Spray and delivered into (and reacted with) IHR and particularly the surface plasma reactions, to increase micro-etching or macro-ablation, cleaning, cracking and modification rates, impart different surface functionalities, or improve micromachined surface finishes.

In summary, the present invention is a dry (non-solvent, non-aqueous), nominally atmospheric hybrid particle-plasma ablation process that combines surface heating, ionization and electron and/or photon driven surface ablation phenomena comprising ionizing-heating radiation (IHR) beams or plumes (surface plasma processes) with simultaneous surface cleaning and cooling actions provided by a precisely controlled carbon dioxide ($CO_2$) composite spray ($CO_2$ particle impact processes). The $CO_2$ composite spray is used to both precisely control surface temperature and cleanliness; the simultaneous removal of heat contamination and impingement of particle energy and vectoring of processing debris such as oxidation residues, deflagration residues, corrosive gases, atmospheric contaminants (i.e., moisture, salts, organics, particles), and ablated surface particles generated by the IHR-generated surface plasma processes, and other energetic phenomena.

Uniquely, a $CO_2$ Composite Spray is used in the present invention to cover the entire IHR beam or plume contact area on the surface, behaving as a prophylactic; protecting processed surfaces from deleterious heat and plasma surface reactions and atmospheric contamination. The IHR photonic and electronic energy is beamed through and mixed, respectively, into a thin, high velocity $CO_2$ particle fluid layer—working continuously on clean-cool native surfaces at all times, the bulk substrate below remains room temperature at all times. Surface temperatures are controlled during the hybrid treatment process to provide uniform surface treatment over the entire substrate surface.

The present invention enables IHR processing power and scanning speeds over a wider range for optimized micro-etching or macro-ablation of surfaces through the simultaneous adjustment of $CO_2$ particle concentration and propellant pressure of the protective $CO_2$ Composite Spray. The present invention prevents warping or distortion of delicate or thin surfaces or surface features, and prevents the formation of surface residues and heat discoloration within the heat-affected zone (HAZ).

Finally, the present invention is directed particularly at the treatment or processing of labile, fragile, soft or very thin polymeric substrates constructed of thermoplastics, thermosets, composites and many other organic manufacturing substrates used in the fabrication of, for example, ophthalmic lenses and microfluidic devices. To those skilled in the art, it is generally known the various challenges and constraints associated with utilizing Laser and AP processing technology to precisely etch or ablate polymeric materials at the microscopic scale—and in particular to efficiently produce uniform surface features on thin substrates at acceptable processing rates. This is due to the aggressive reactions and intense heat associated with these IHR manufacturing technologies. It is a particular aim of this invention to improve conventional IHR-powered machining and surface modification processes to provide improved surface finishes, enhanced uniformity of processing, and cleaner surfaces. It is still another aim to allow for faster processing, for example using higher IHR energies.

Laser and AP are exemplary and preferred IHR processes of the present invention. However alternative IHR processes such as Corona Discharge, RF Ablation and UV light may also be employed to form alternative Particle-Plasma Ablation processes. In addition, although preferred substrates for use with the present invention are organic, the present invention can be used to process inorganic materials such as glass or ceramics. For example, machining ceramics with a Laser is a heat-induced fracture-ablation process. Laser heating induces compressive stresses (and creates micro-cracks as well) in a brittle ceramic, subsequent cooling and cleaning actions of $CO_2$ Composite Spray used simultaneously during Laser heating induces tensile stresses which helps propagate the micro-cracks to fracture the workpiece and remove fractured pieces from the surface.

Still moreover, the present invention is a cost- and performance-effective alternative to "wet" processes such as organic solvents, and aqueous and semi-aqueous, alkaline and acidic cleaning and etching chemistries to prepare surfaces for hard coating, thin film vacuum coating, sputter coating, bonding, underfilling, and many other applications requiring improved surface adhesion properties. The present invention eliminates the need for these wet chemistries and associated wet rinsing agents such as expensive deionized water, and requisite energy-intensive substrate drying processes. The present invention replaces multi-stage processes common to conventional surface cleaning and etching processes with a highly robust, dry single-step surface treatment capability. Substrates processed using the present invention are dry in and dry out, room temperature in, and room temperature out. Substrates can be transformed at both the microscopic and macroscopic dimension with consistent quality using the present invention, and without producing wastewater, waste chemicals, air pollution, waste energy and wasted production line space. Furthermore the present invention is a simple, dry, and clean process that mitigates cross contamination issues common to conventional processes and provides faster, more efficient substrate processing with a lower cost of operation (CoO).

The present invention resolves the constraints of current IHR manufacturing technology, and prior art $CO_2$-enabled IHR treatments, providing improved process productivity, surface quality, and improved environmental and cost of ownership as compared to conventional wet alternatives, and is described in detail below.

The present invention introduces such refinements. In its preferred embodiments, the present invention has several aspects or facets that can be used independently, although they are preferably employed together to optimize their benefits. All of the foregoing operational principles and advantages of the present invention will be more fully appreciated upon consideration of the following detailed description, with reference to the appended drawings.

BRIEF DESCRIPTION OF THE DRAWINGS

FIG. 2—Diagram describing hybrid treatment process of the present invention.

FIG. 3a-Diagram describing simultaneous treatment phenomena of the present invention in terms of mechanical and chemical changes to surfaces.

FIG. 3b-Chart describing hybrid spray treatment process variables used to test an exemplary aluminum surface for discrete process changes in work function using photoemission analysis.

FIG. 3c-Diagram describing simultaneous treatment phenomena of the present invention in terms of changing in work function using photoemission analysis.

FIGS. 5a, 5b, 5c and 5d-Related diagrams describing an exemplary hybrid treatment spray of the present invention comprising blown ion plasma overlaying a $CO_2$ Composite Spray.

FIG. 8a-Picture showing an exemplary hybrid treatment of fluorosilicone (FSR) rubber substrate using the present invention using a near-infrared laser and a $CO_2$ Composite Spray; fluorosilicone rubber milled using a Diode Laser with a 60 Watt power source and operating at a wavelength of approximately 940 nm.

FIGS. 10a and 10b-Diagrams comparing the process changes from a conventional surface treatment method to the present invention for an optical surface coating application, respectively.

FIGS. 11a, 11b, and 11c-Related charts describing surface treatment performances using the present invention for polycarbonate (PC), CR39™, and Trivex™ polymeric optical substrates, respectively.

DETAILED DESCRIPTION OF THE INVENTION

Figure 1A:
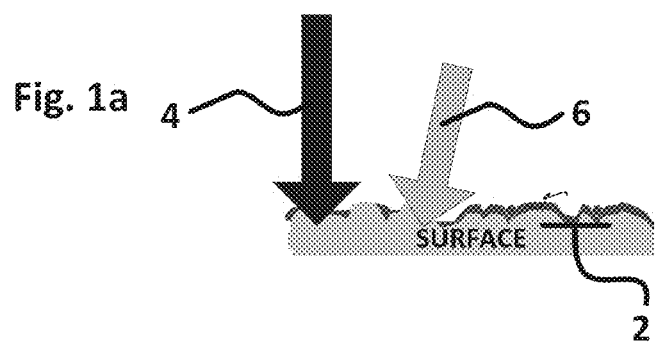
FIG. 1a—Diagram describing a prior art sequential method for treating a surface using an ionizing-heating radiation (e.g., atmospheric plasma) and a $CO_2$ Composite Spray, FIG. 1b-Diagram describing a prior art simultaneous method for treating a surface using an ionizing-heating radiation (e.g., atmospheric plasma) and a $CO_2$ Composite Spray.

FIG. 1a is a diagram describing a prior art sequential method for treating a surface using a commercially available ionizing-heating radiation treatment spray and a $CO_2$ spray cleaning jet, such as a $CO_2$ Composite Spray developed by the first-named inventor. Referring to FIG. 1a, a conventional process used to modify a substrate surface (2) employs the sequential steps of first ablating a surface with an ionizing-heating radiation, referred to as IHR, (4) such as a blown ion plasma, corona plasma or laser; following which the ablated surface, which is being exposed to IHR heat contamination and a developing debris field comprising particles, thin films and other ablation residues such as oxidized surfaces, is precision cleaned using a $CO_2$ spray jet (6). This prior art process, although effective if performed precisely, requires more process time because two steps, and several iterations of same, must be employed to achieve the desired surface changes. This is required because the IHR step must be performed in quick and multiple passes, with follow-on $CO_2$ jet spray cleaning steps, to prevent excessive exposure and build-up of ablation heat and oxidized contamination on surfaces, and in particular polymeric surfaces. As shown in FIG. 1a, the prior art thus described does not compose a hybrid surface treatment composition.

Figure 1B:
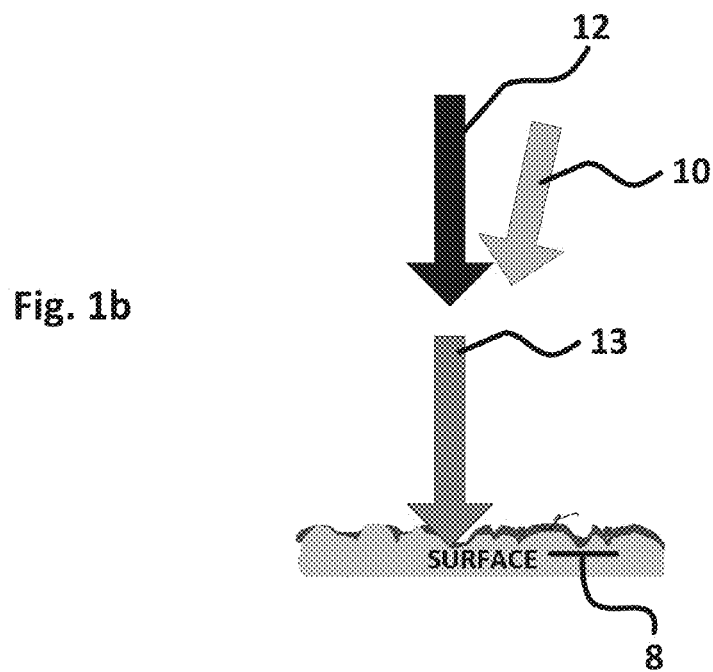
FIG. 1c-Diagram describing the present invention simultaneous method for treating a surface using an ionizing-heating radiation (e.g., atmospheric plasma and Laser) and a $CO_2$ Composite Spray.

FIG. 1b is a diagram describing a prior art simultaneous method for treating a surface using a commercially available ionizing-heating radiation treatment spray and a $CO_2$ spray cleaning jet, such as a $CO_2$ Composite Spray developed by the first-named inventor. Referring to FIG. 1b, a conventional process developed by the first-named inventor of the present invention under U.S. Pat. Nos. 7,901,540 and 8,021,489 describe a coaxial plasma-$CO_2$ spray generator apparatus and method to simultaneously apply to a substrate surface (8) an atmospheric composition of corona plasma (10) and $CO_2$ cleaning particle stream (12). The prior art hybrid process thus described generates both treatment streams internally within a coaxial apparatus and mixes the two streams in the atmosphere (13) immediately exiting the hybrid device spray nozzle ('540, FIG. 3, 124); delivering the resulting composition to the substrate surface below. The '540 invention presents difficulties with regards to being able to independently balance the RF corona plasma power with the $CO_2$ spray composition, particularly when higher plasma power is desired (i.e., increased ion generation). This is required to increase plasma surface treatment rates on the substrate surfaces. Using high-power plasma requires a richer (higher $CO_2$ particle concentration) $CO_2$ Composite Spray to compensate for higher mixing temperatures to prevent premature sublimation of beneficial $CO_2$ cleaning particles. Moreover, the beneficial surface heating derived from the plasma is diminished with higher $CO_2$ particle concentrations. Still moreover, this technique is not useful for removing (ablating) significant amounts of surface material in a short period of time using high powered plasma or laser sources, among other IHR ablation techniques. As shown in FIG. 1b, the prior art thus described composes a hybrid composition within a IHR-$CO_2$ particle spray mixing nozzle, and within the atmosphere immediately exiting the same, and delivers the resulting treatment composition to the substrate surface below. The prior art thus described fails to teach the method of combining two or more different IHR and $CO_2$ particle treatment sprays, generated by two or more different IHR and $CO_2$ particle treatment spray generation devices, to form new and novel hybrid treatment compositions directly upon the substrate surface (8).

Having thus described the prior art related to the present invention, it is evident that an improved method for ablating, modifying, transforming, treating or otherwise processing a substrate surface, using higher power IHR technology hybridized with the superior cooling and cleaning effects of a $CO_2$ jet, and in particular the superior operational and compositional control of same afforded using a $CO_2$ Composite Spray developed by the first-named inventor of the present invention, would be very useful. The improved IHR-$CO_2$ process of the present invention provides faster, more efficient, and more effective substrate treatment—in particular ablating, modifying, machining and cleaning—accomplished by the various possible hybrid IHR-$CO_2$ particle processes using the method described herein; referred to as surface transformation or surface treatment processes. Moreover the present invention is particularly useful for the surface transformation of thin polymeric substrates—for example microfluidic devices and ophthalmic lenses composed of thin rubbers, plastics and composites, as well as other types of substrates and surfaces susceptible to surface contamination such as surface heating, oxidation, burning, surface stress fracturing, and other phenomena generated by IHR and referred to as surface plasma reactions herein. Excessive surface contamination produces undesirable processed surface defects such as varying surface features (surface finish, etching, dimensional control etc.), charring or weak bonding surfaces, cosmetic defects such as discoloration, among other defects.

Figure 1C:
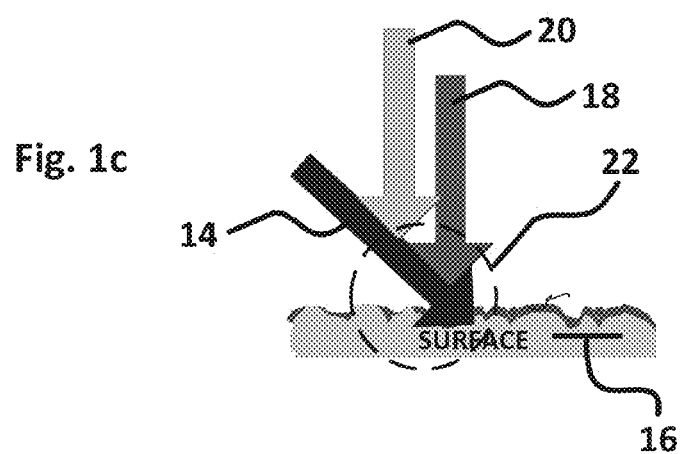

Referring to FIG. 1c, a diagram describing the present invention for simultaneously treating a surface using an ionizing-heating radiation (e.g., atmospheric plasma and Laser) and a $CO_2$ Composite Spray, the present inventors have discovered that directing a $CO_2$ Composite Spray (14) onto a surface (16) and imposing a conventional high-powered IHR beam or plume, such as a near-infrared Laser beam (18) or an atmospheric blown ion plasma plume (20), or both simultaneously as shown, through the $CO_2$ Composite Spray (14) and onto the same surface portion (22) produces beneficial results such as faster processing with cleaner-cooler surfaces as compared to prior art gas-assisted and $CO_2$-assisted hybrid surface treatment processes described above. This is particularly apparent when processing soft substrate surfaces such as polymers and plastics requiring faster and more aggressive surface treatments such as microetching and micromachining at high speed using the present invention.

Having briefly introduced the present invention under FIG. 1c herein, the simultaneous processes of the present invention can best be understood and appreciated with the following discussion under FIGS. 2, 3a and 3b.

FIG. 2 is a diagram describing hybrid treatment process of the present invention. Referring to FIG. 2, the present invention is a novel hybrid treatment process that combines the synergistic characteristics and reciprocal cooperation of IHR upon a $CO_2$ Composite Spray (24) and a $CO_2$ Composite Spray upon IHR (26); and both upon the same surface portion (28). Effective hybrid processes operate with productivities and results that surpass those of the individual hybrid components; in the present invention the limitations of the IHR (30) and the $CO_2$ Composite Spray (32) operating individually as described under FIG. 1a herein.

Again referring to FIG. 2, the present invention is termed herein as a hybrid particle-plasma ablation process. The present invention combines surface heating, ionization and electron and/or photon driven surface ablation phenomena comprising IHR beams or plumes—surface plasma processes (34) with simultaneous surface cleaning and cooling actions provided by a precisely controlled carbon dioxide ($CO_2$) composite spray—$CO_2$ particle impact processes (36). The $CO_2$ composite spray (32) is used to both precisely control surface temperature and cleanliness; the simultaneous removal of heat contamination and processing debris such as oxidation residues, deflagration residues, corrosive gases, and ablated particles, collectively referred to as surface material or surface contamination (38) generated by the IHR-generated surface plasma processes (34), from a surface (40). For example, the present invention can be used to precisely transform a surface—exemplified by ablating clean, dimensionally-accurate features into a soft rubber surface using a laser-powered IHR, described under FIGS. 4b, 8a, 8b, and 8c herein.

Uniquely, a $CO_2$ Composite Spray (32) is used to cover the entire IHR beam or plume contact area on the surface, behaving as a prophylactic; protecting processed surfaces from deleterious heat (i.e., not too much process heat and not too little process heat) and surface plasma reactions. The IHR photonic and electronic energy beam (30) is projected through, being that the $CO_2$ Composite Spray is transparent to the wavelength, and mixed, respectively, into a thin, high velocity $CO_2$ particle fluid layer (42). Working in cooperation, the energy and particle streams allow the process to operate continuously on clean-cool native surfaces at all times, the bulk substrate (44) temperature below is controlled at all times. Surface temperatures are controlled to optimize surface treatment processes and provide uniform surface treatment action over the entire substrate.

The present invention enables IHR (30) processing power to be increased and scanning speeds for micro-etching or macro-ablation to be increased as well through adjustment of the particle concentration and propellant pressure of the protective $CO_2$ Composite Spray (32). This dry temperature control aspect of the present invention prevents warping or distortion of delicate or thin surfaces or surface features, and prevents the formation of surface residues and heat discoloration within the heat-affected zone in and around beam or plume and particle contact surfaces (28).

Finally, and again referring to FIG. 2, arguably, one of the most important and practical aspect of a hybrid process from a manufacturing perspective is productivity. The improved performance of the present invention can be explained by discussing hybrid process kinetics. Arbitrarily designating IHR as (P) and a $CO_2$ Composite Spray as (S); it is shown in the referenced figure that the hybrid treatment rate (Q) for the present invention is an additive function (46)—the sum of [IHR treatment rate with $CO_2$ spray assisting (Q(P|S))], [$CO_2$ spray cooling-clean rate with IHR assisting (Q(S|P))], and [Positive interactions between IHR and $CO_2$ spray (Q(P:S))], for example the incorporation of ozone and ions from the IHR plume into the $CO_2$ spray). The result is a robust process and a very large process window. Exemplary Key Process Variables (KPVs) for the present invention include:

1. $CO_2$ Composite Spray:
   Particle size(s) and feed rate(s) into propellant fluid stream
   Propellant fluid type(s), pressure(s) and temperature(s)
   Propellant fluid additive(s)
   Transparency to IHR wavelength (certain additives can be chosen to absorb/react)
2. IHR:
   Power density—(all IHR)
   Wavelength—(Lasers, IR)
   Frequency—(Laser, Corona, Blown Ion, RF)
3. Processing:
   Scan rate
   Scan Distance from substrate surface
   IHR Scan with $CO_2$ Composite Spray Scan
   IHR Scan with $CO_2$ Composite Spray Stationary Using a pre-determined set of KPVs for the $CO_2$ Composite Spray and IHR, a surface is scanned in pre-determined and complex Cartesian space directions (x, y, z, and B axis) at a scan rate (48) of between 0.1 mm/sec and 200 mm/sec with the hybrid treatment device spray nozzles (not shown) positioned at a predetermined distance (50) from the surface, and with the sprays projected and intersected as follows. The $CO_2$ Composite Spray (32) is optimally projected at an angle of between 45 and 60 degrees from normal, and generally anywhere from 15 degrees to 85 degrees from normal, with the exemplary spray device and nozzle (both not shown) positioned at a distance of between 6 mm and 300 mm from the surface. The device nozzle (not shown) to deliver the IHR beam or plume (30) is positioned to project its beam or plume into, through and along the $CO_2$ Composite Spray (32), and onto the same portion of surface (28) that the $CO_2$ Composite Spray is contacting. Thus the $CO_2$ Composite Spray is used in the present invention as a cleaning-cooling prophylactic barrier between the IHR beam or plume (30) and substrate surface (40). The IHR beam or plume (30) may be moved or repositioned anywhere over the flowing $CO_2$ Composite Spray (32) to optimize surface treatment and/or debris vectoring to process a large surface area. For example, the $CO_2$ Composite Spray, using one or more spray nozzles, may be fixed at an angle and scan distance from the substrate surface to produce a $CO_2$ particle-fluid prophylactic barrier over a large swath of surface while the IHR beam or plume is moved or relocated selectively over same.

Using the process described under FIG. 2, a surface may be uniformly ablated, micro-etched, chemically modified, and/or micro-machined depending upon the type of IHR(s) and KPVs for the hybrid IHR-$CO_2$ particle ablation process. The present invention also can uniquely combine more than one type of IHR with a $CO_2$ composite Spray to perform multiple surface treatment functions in a single process. For example projecting both a laser and blown ion plasma plume into the same portion of surface that a $CO_2$ Composite Spray is flowing against allows for simultaneous micro-machining (Laser-$CO_2$ particle component) and micro-etching of said micromachined surfaces (Ion-$CO_2$ particle component). The 3-component hybrid process thus described can simultaneously provide macro and micro surface transformations (i.e., surface energy) for both machining and surface preparation for precision assembly, bonding, coating and other follow-on manufacturing steps in a single process.

Figure 3D:
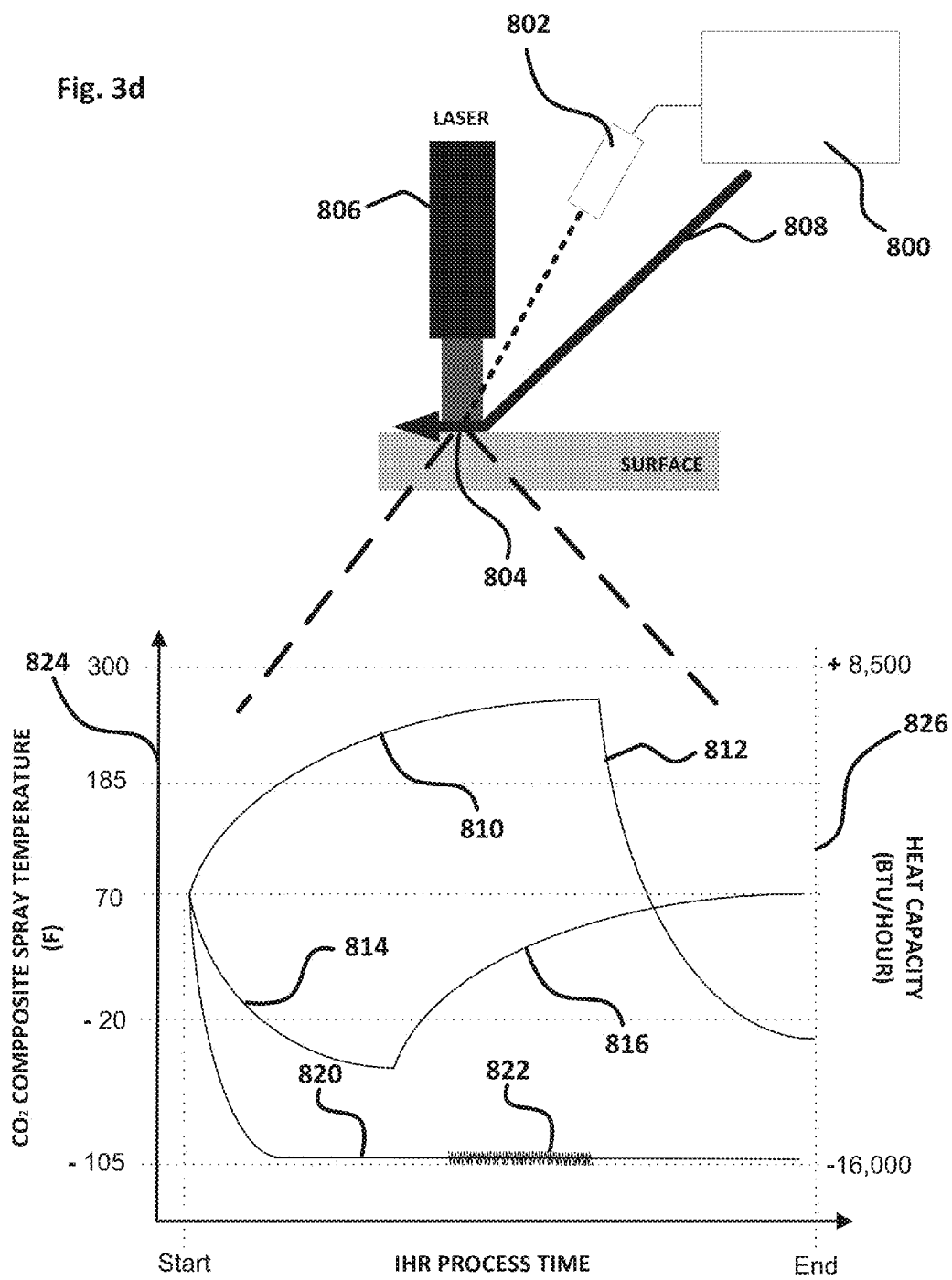
FIG. 3d—Diagram describing various exemplary heat capacities which can be generated and delivered to a substrate surface portion using a $CO_2$ Composite Spray to mitigate or control IHR-generated surface reaction heat (plasma).

FIGS. 3a, 3b, 3c, and 3d describe simultaneous surface treatment phenomenon of the present invention in terms of both mechanical and chemical changes, illustrating the unique mechanical and chemical aspects of a hybridized IHR-$CO_2$ spray process. Referring to FIG. 3a, the hybrid treatment process of the present invention—using an exemplary IHR-$CO_2$ particle spray comprising a blown ion plume projected into a $CO_2$ Composite Spray against the same surface portion (52) as described under FIG. 2—simultaneously performs 3 functions: pre-cleaning surface portion (54), micro-ablation and surface modification (56), and continuous cleaning and cooling (i.e., surface portion is not too hot, nor too cool) during IHR processing (58). This can be illustrated and demonstrated by examining the changes in surface work function between discrete treatments using the conventional surface treatment approach as described under FIG. 1a herein, described under FIGS. 3b and 3c below.

FIG. 3b is a chart showing process metrics for a prior art surface treatment comprising a $CO_2$ Composite Spray Treatment; propellant (60), particle generation (62), Blown Ion Treatment; blown ion generation (64), and scan rate and distance metrics (66) for treatment an aluminum metal substrate. A commercial photoemission analyzer procured from Photoemission Technologies, Inc., Camarillo, Calif., Model SQM 200, was used to examine changes in surface work function following discrete treatments. UV-irradiated surface emission data generated by the SQM 200 are measured as Optically Stimulated Electron Emission (OSEE) values. A higher OSEE value indicates a cleaner surface; the highest value being obtained for an uncontaminated technical surface. A pure, uncontaminated aluminum substrate containing no oxides, particles or residues was measured using the SQM 200 to determine a baseline for a clean surface (highest OSEE value), following which the cleaned surface was uniformly contaminated with a oils and particles using a swab, and measured again to determine a dirty surface baseline (lowest OSEE value). Several OSEE measurements (n>3) were acquired and averaged for each discrete treatment step and test. A sequential surface treatment process (and subsequent OSEE measurement) in accordance with the process metrics described under FIG. 3b was performed; comprising the steps of (1) Three (3) $CO_2$ Composite Spray treatments for T=30 seconds each, (2) Three (3) Blown ion plasma treatments for T=30 seconds each, and (3) Three (3) $CO_2$ Composite Spray treatments for T=30 seconds each on the same portion of surface. The results and significance of this test relevant to the present invention are described under FIG. 3c.

Referring to FIG. 3c, the OSEE measurements clearly demonstrate the changes to surface work function with each step. More significantly, the OSEE data chart (68) demonstrate how the two processes, blown ion and $CO_2$ Spray, work cooperatively to return the surface from its dirty state (70) of 103 OSEE units to the original clean state (72) of 574 OSSE units. Starting at an OSEE value of 103, a first $CO_2$ spray treatment reaches a peak value of 450 OSEE units (74) or approximately 78% of clean state. Following this the blown ion plume is used to break up and dispersal onto $CO_2$ spray cleaned surfaces tenacious and adhering surface residues such as oxides, organics and salts. This is demonstrated in the data as a reduction in OSEE value—from 450 to 430 OSEE units (76). Following this, the ion-treated surface is further cleaned with the exemplary $CO_2$ Composite Spray as described above, which results in the surface work function rising from 430 to 536 OSEE units (78), or 93% of absolute clean state. At this point native oxides have grown on the aluminum surfaces and the technical surface has reached its peak OSEE value. With regards to the present invention, the simultaneous hybrid surface treatment process achieves the same result (over time) in a continuous method represented by the treatment progress line (80) shown in FIG. 3c.

Further, other embodiments may allow for a combination of different types of the hybrid IHR-$CO_2$ particle ablation process including without limitation: multiple cleaning steps, length and time for cleaning and/or multiple sources of ionizing-heating radiation.

An important aspect of the present invention is the management of heat contamination—contamination being defined as excess surface heating which if not controlled properly can result in material processing defects such as dimensional control problems, discolorations, uneven surface treatments, and slow processing. In this regard, and now referring to FIG. 3d, various exemplary thermal profiles or heat capacities which can be generated and delivered to a substrate surface using a $CO_2$ Composite Spray for the IHR-generated heat. The exemplary heat capacities of FIG. 3d are derived from the infinitely-variable $CO_2$ spray compositions comprising various mixtures (ratios) of temperature-, flow- and pressure-controlled compressed air (CA) and flow- and particle size-controlled portions of solid carbon dioxide ($CO_2$) particles using an apparatus as described under above-referenced patents by the first-named inventor herein. As shown in FIG. 3d, $CO_2$ Composite Spray cooling compositions and temperatures can be controlled automatically using, for example, an Infrared temperature controller (800) and thermometer (802), and projected against the same surface portion (804) as the intersecting IHR beam or plume and $CO_2$ spray and connected to a $CO_2$ Composite Spray generator (not shown). For example, the power output of the IHR laser (806) is expressed as an increase in temperature at the contacting surface portion (804). The $CO_2$ Composite Spray (808) heat capacity is adjusted automatically to compensate for excess surface heating.

It is important to understand and appreciate the need for precise thermal control in the present method. Too much cooling will retard beneficial heat-accelerated surface ablation reactions while too little cooling will be detrimental as well. For example, too much cooling can prevent surface material removal or too little cooling can cause surface discoloration, melting or burning. The correct amount of cooling action is dependent upon the hybrid treatment scheme and substrate material being processed, for example the specific type of IHR source used, beam or plume power applied, and other critical key process variables (KPVs), as well as the thickness and type of substrate material. For example in laser processing of metals —the ablation mechanism is melting; for ceramics—the ablation mechanism is fracturing; and for plastics—the ablation mechanism is decomposition. This is also very true for atmospheric plasma, in particular $CO_2$ and oxygen-rich ($O_2$) plasmas, which can produce extreme plume temperatures that can melt surfaces such as thin plastics or miniature structures and features that are contained thereon. As such, different hybrid surface treatment schemes and substrate applications require different types of thermal control compositions, required to either accelerate or retard the IHR ablation phenomena. Chemistry of the composition also plays a major role in IHR-CO$_2$ particle processing and is discussed further below.

In this regard, and again referring to FIG. 3d, a substrate surface, specifically the IHR-CO$_2$ particle spray contact portion thereon (804), may be subjected to various IHR power densities, due to different IHR-CO$_2$ hybrid treatment schemes and substrates—an surface modification or transformation requirements. Therefore different impingement spray heat capacities may be required, for example, a lowering heat capacity (810) gradient followed by an increasing heat capacity gradient (812); an increasing heat capacity gradient (814) followed by a lowering heat capacity gradient (816); or an increasing heat capacity gradient (818) followed by a maintenance of a portion of a substrate surface (804) at a certain constant heat capacity (820). Moreover, an oscillating CO$_2$ Composite Spray (822) may be introduced to enhance heat exchange (and cleaning-scouring action) at the substrate surface. Also shown in FIG. 3d, during the application of the IHR beam or plume to the same portion of a substrate surface, various spray temperatures ranging from −105 degrees F. to +300 degrees F., or more, (824) may be applied having a range of heat capacities from −16,000 BTU/hour, or more, to +8,500 BTU/hour, or more (826).

Figure 4A:
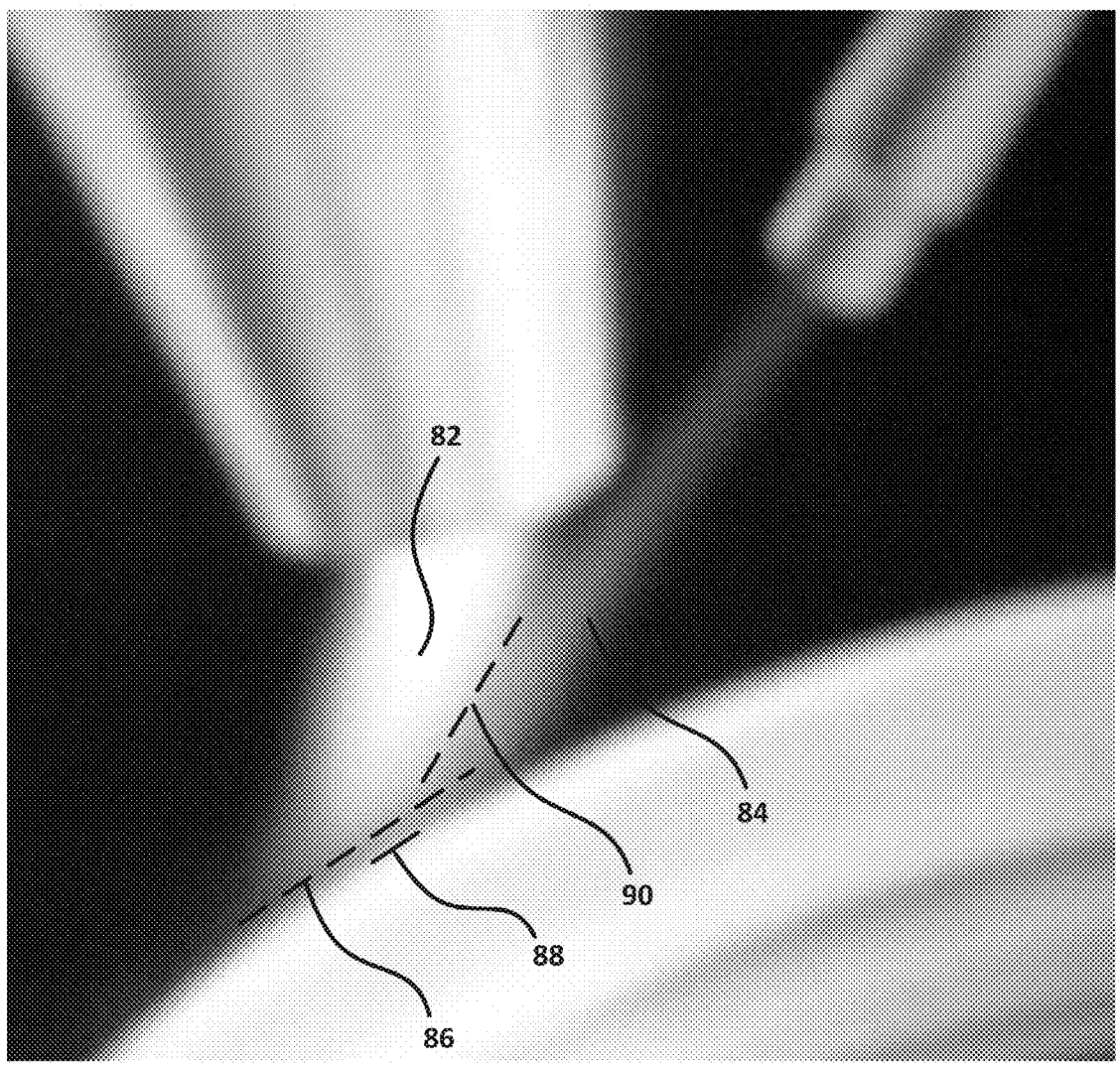
FIG. 4a-Picture showing an exemplary hybrid surface treatment spray of the present invention comprising blown ion plasma overlaying a $CO_2$ Composite Spray.

Finally, the unique benefits of using a CO$_2$ Composite Spray in the present method can be further illustrated by examining instantaneous surface portion fluid compositions. For example, the addition of chemical additives (gases and aerosols) into the IHR-CO$_2$ particle surface portion can be very beneficial. For example, oxygen can be beneficial in certain applications requiring oxidation reactions (i.e., metal ablation) and is provided using an oxygen-rich propellant gas with the CO$_2$ Composite Spray. In other applications the absence of oxygen is beneficial, for example the laser processing of thin plastics or composites, where a CO$_2$-rich atmosphere has been shown to be advantageous. The propellant gas can be oxygen-rich, 100% nitrogen, 100% carbon dioxide or argon, mixtures thereof, and may contain other chemistries such as organic additives which may be delivered into the same surface portion and reacted with the IHR beam or plume. For example, in surface modifications requiring new surface chemistry, organic reactants such as, for example, silanes, siloxanes, fluorinates, amines and other organic compounds may be introduced (vis-à-vis the exemplary and preferred CO$_2$ Composite Spray delivery scheme) into the IHR-CO$_2$ particle surface portion (plasma reaction zone) and reacted with and bonded to ablated surfaces. An exemplary hybrid surface treatment process for practicing the present invention is shown in FIG. 4a; comprising a blown ion plume (82) projected over a CO$_2$ Composite Spray (84). As can be seen in the photograph there is a very thin prophylactic film of flowing particles and gas (86) flowing between the upper ion plume (82) and substrate surface (88). The interaction of the ion-infused CO$_2$ spray (90) and substrate surface (88) is described under FIGS. 5a, 5b, 5c, and 5d below.

Figure 4B:
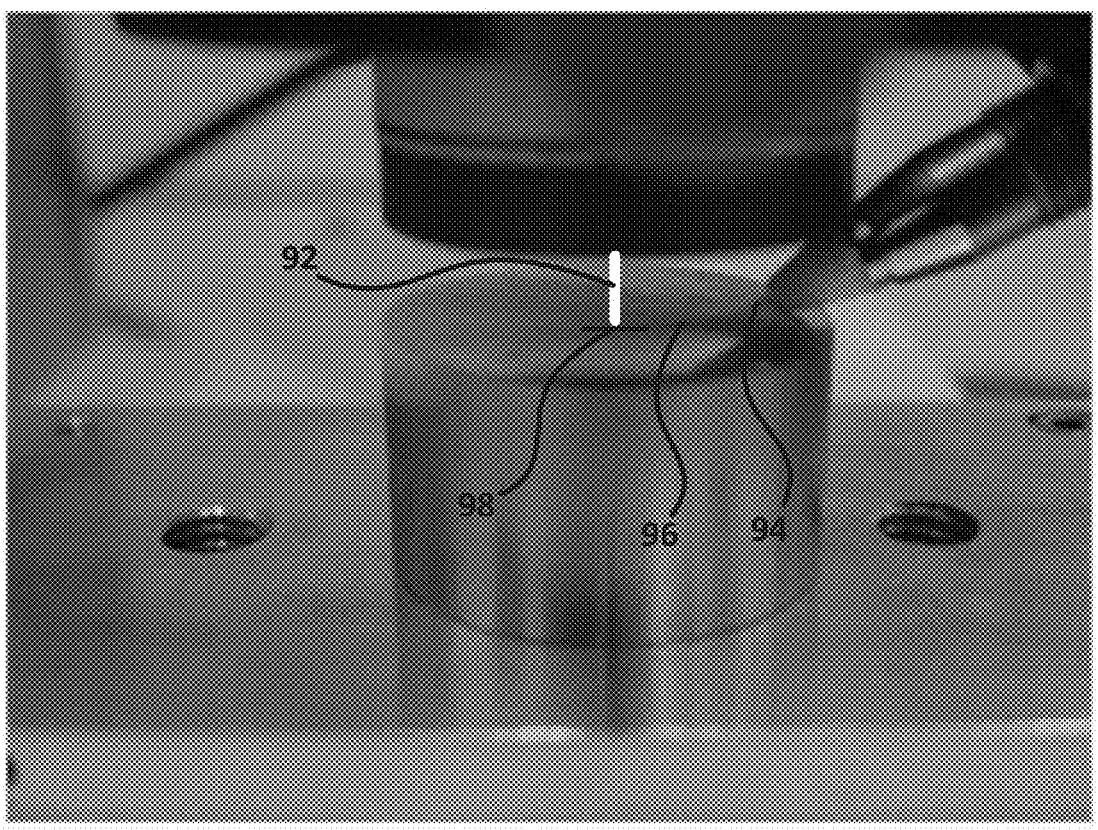
FIG. 4b-Picture showing an exemplary hybrid treatment spray of the present invention comprising near-infrared laser passing through a $CO_2$ Composite Spray flow stream.

Another exemplary hybrid surface treatment process for practicing the present invention is shown in FIG. 4b; comprising a near infrared laser (92) projected over a flowing CO$_2$ Composite Spray (94). As can be seen in the photograph there is a very thin prophylactic film of flowing particles and gas (96) flowing at the contact surface portion between the laser beam (92) and substrate surface (98). As discussed under FIG. 2 herein, the laser beam may be repositioned anywhere over the flowing prophylactic barrier or both the laser beam and CO$_2$ particle-fluid stream are moved together. The substrate treatment benefit derived from the interaction of the exemplary laser beam (92), CO$_2$ particle stream (94), and substrate surface (98) is described under FIGS. 8a, 8b, and 8c below and is illustrated with the micro-machining of soft rubber surfaces.

Figure 5C:
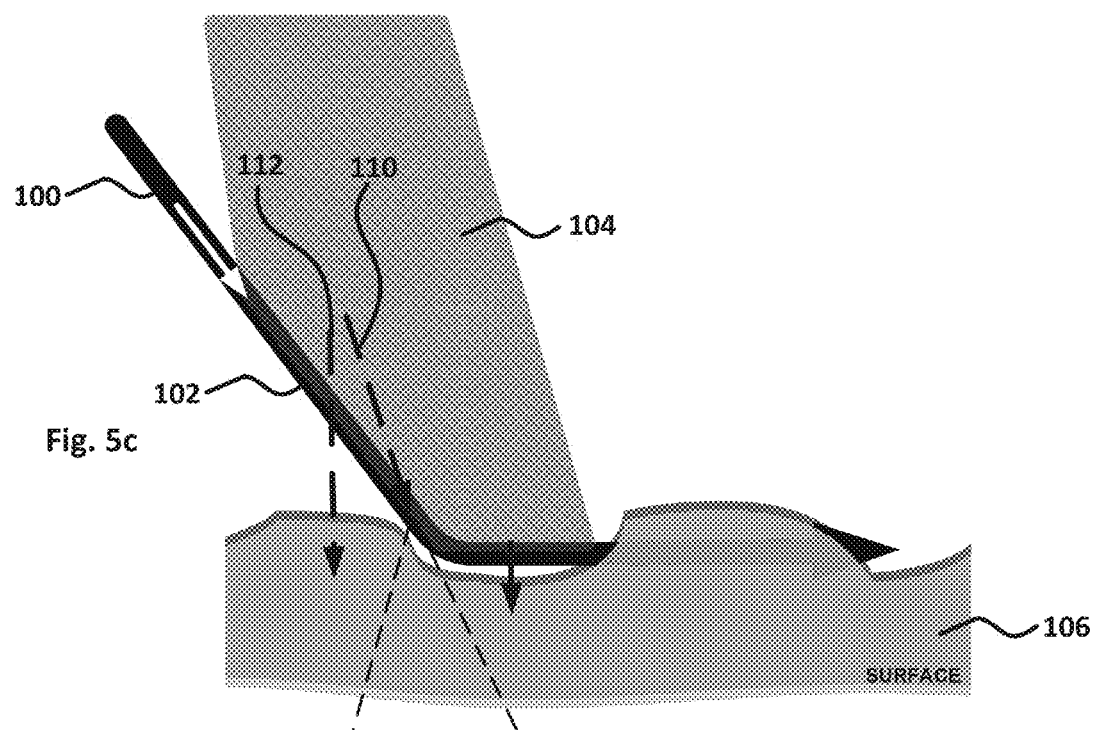
Figure 5D:
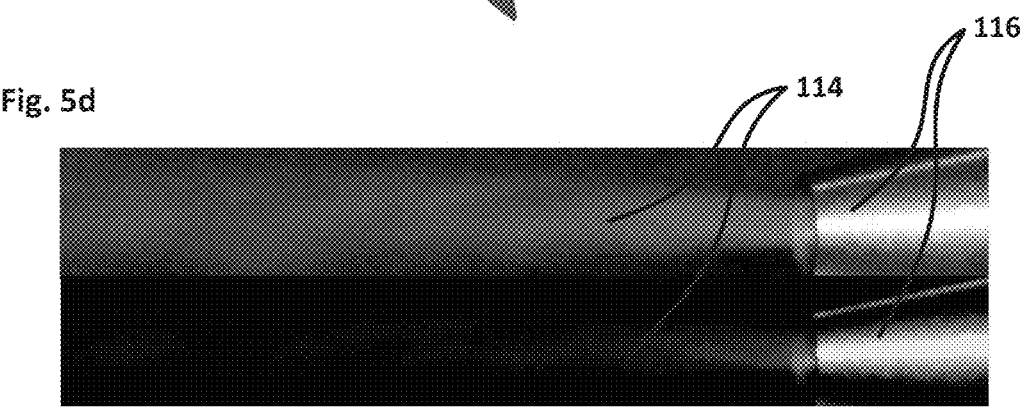

FIGS. 5a, 5b, 5c and 5d are related diagrams describing the exemplary hybrid treatment spray as shown under FIG. 4a. Referring to FIG. 5a, the CO$_2$ Composite Spray (100) shears (102) the blown ion plume (104) as it flows toward and against the substrate surface (106). Referring to FIG. 5b, a view upwards into the CO$_2$ spray-ion plume and surface contact reveals an elongated interface (108). Referring to FIG. 5c, the interface (102) between CO$_2$ Composite Spray (100) and the blown ion plume (104) is revealed to be a turbulent, interactive and transmissive. The CO$_2$ spray fluids and particles quench heated gases and incorporate ions and ozone (110) from the ion plume into the CO$_2$ Composite Spray; while beneficial ionizing and heating UV and IR radiations (112) transmit directly through the CO$_2$ Composite Spray and onto the surface portion (106) being treated below. Referring to FIG. 5d, the mechanism for interfacial mixing can be understood by examining a photograph of a CO$_2$ Composite Spray. As shown in FIG. 5d, a CO$_2$ Composite Spray rotates like a corkscrew as the propellant and particle streams (114) mix at the nozzle exit (116). The interface between the CO$_2$ spray and ion plume is mixed through this vortical mixing action (118). Using the exemplary CO$_2$ Composite Spray device of U.S. Pat. No. '154, spray nozzles may be employed that change the rotational and oscillatory nature of the CO$_2$ particle-fluid stream in contact with the IHR beam or plume and substrate surface portion to enhance energetic vortical mixing and surface scouring actions. For example a CO$_2$ Composite Spray may be made to rotate faster and exhibit particle injection pulsation to introduce beneficial oscillation phenomena into the stream (i.e., Jackhammer Effect). Finally, various types of IHR beams or plumes suitable for use with the present invention exert an atmospheric fluid pressure, for example an atmospheric blown ion or corona discharge plasma, and similar to the CO$_2$ Composite Spray. It is an aspect of the present invention to generate a surface spray pressure, and more particularly a spray velocity, using the CO$_2$ Composite Spray that causes shearing and mixing action at the interface and substrate surface. The CO$_2$ Composite Spray is typically projected at a pressure (and velocity) greater than a IHR plume pressure and velocity which also prevents the IHR plume from plowing into and pushing the prophylactic CO$_2$ spray away from the substrate surface.

Figure 6A:
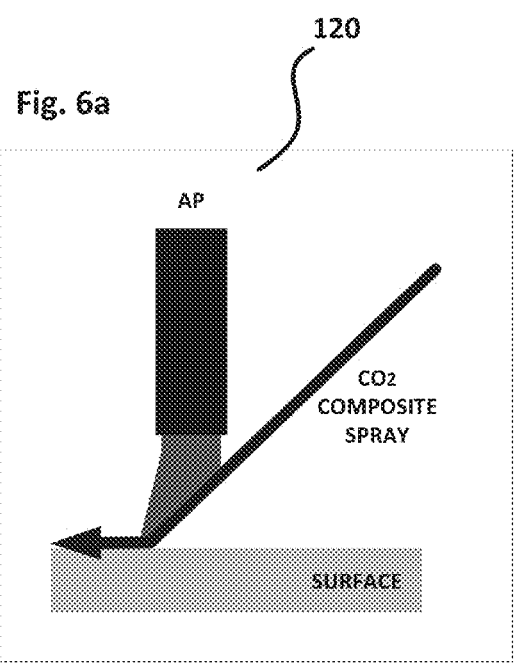
FIGS. 6a, 6b, and 6c-Related diagrams describing how the present invention may be utilized to perform micro-etching, micro-machining or both simultaneously using three exemplary hybrid treatment schemes.
Figure 6B:
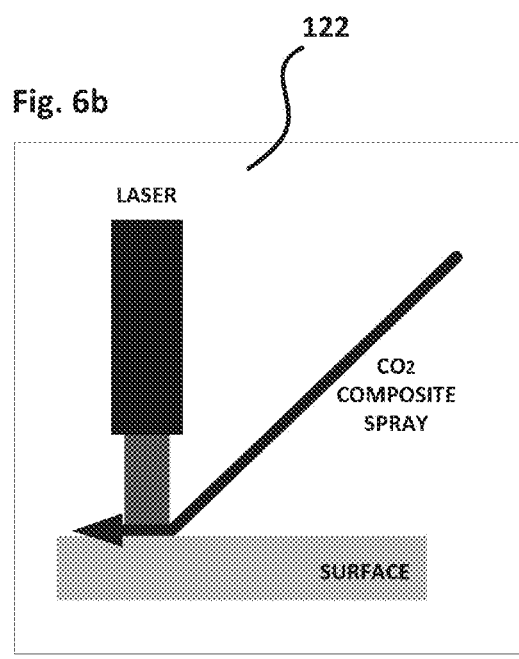
Figure 6C:
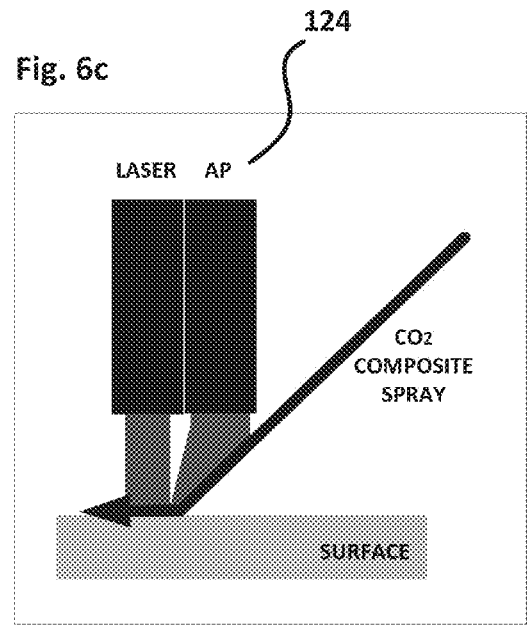

FIGS. 6a, 6b and 6c describe how the present invention can be utilized to perform micro-etching, micro-machining or both simultaneously, using three exemplary hybrid treatment schemes. As shown in the referenced diagrams, the present invention may be used in one or more of the following preferred hybrid treatment schemes; FIG. 6a-CO$_2$ Composite Spray with Blown Ion or Corona Plasma for applications such as micro-etching and surface modification to prepare a surface for bonding, coating, or underfill (120), FIG. 6b—CO$_2$ Composite Spray with UV, NIR, or IR Laser for applications such as micro-etching, -marking, -machining to micro- and macro-mechanically transform a substrate surface (122), and FIG. 6c—CO$_2$ Composite Spray with both a Blown Ion or Corona Plasma, and UV, NIR, or IR Laser for applications requiring micro-etching, micro-marking, micro-machining followed by micro-etching and surface modification to prepare a surface for bonding, coating, or underfill (124). The present invention overcomes the constraints common to conventional IHR-driven manufacturing processes as follows:

1. Increased surface treatment energy.
2. Precise management of surface heating (not too much, not too little) through the use of the unique compositional control of a $CO_2$ Composite Spray.
3. Continuous cleaning and temperature control is achieved during IHR processing to remove ablated and oxidized surface material.
4. More consistent surface treatments and cleaner surfaces.
5. A wider variety of IHR-powered manufacturing processes for polymeric substrates.
6. Higher productivity.
7. Multiple IHR-CO2 particle (particle-plasma) processes are possible.

Figure 7:
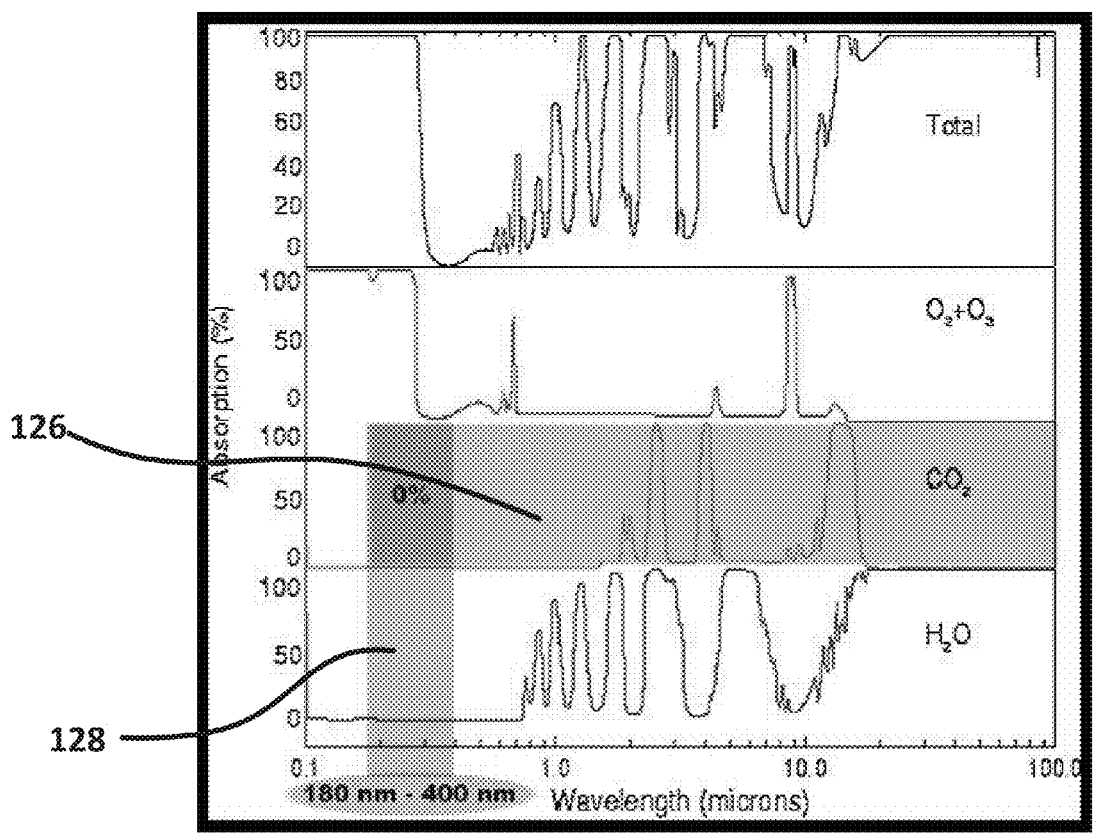
FIG. 7—Diagram describing electromagnetic adsorption spectra for carbon dioxide.

Carbon dioxide is invisible to the radiations used or produced in the present invention. As such it can perform its functions of cleaning and cooling, both the solid particles and gaseous propellants, without interfering with the hybrid IHR component. As shown in FIG. 7, the electromagnetic adsorption spectrum for carbon dioxide shows no adsorption (126) for the wavelengths commonly encountered for near-infrared to infrared lasers and plasma devices used in commercial practice as well as the beneficial UV light (128) derived from same.

Figure 8B:
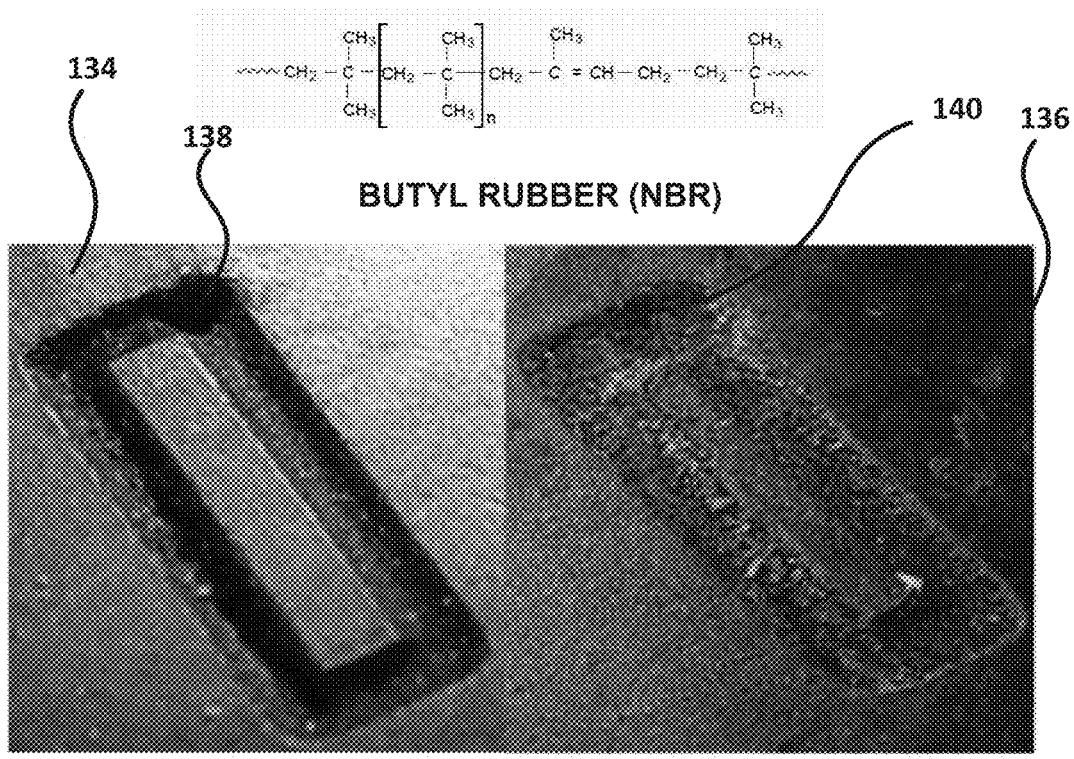
FIG. 8b-Picture showing an exemplary hybrid treatment of butyl rubber (NBR) substrate using the present invention using a near-infrared laser and a $CO_2$ Composite Spray; butyl rubber milled using a Diode Laser with a 60 Watt power source and operating at a wavelength of approximately 940 nm.
Figure 8C:
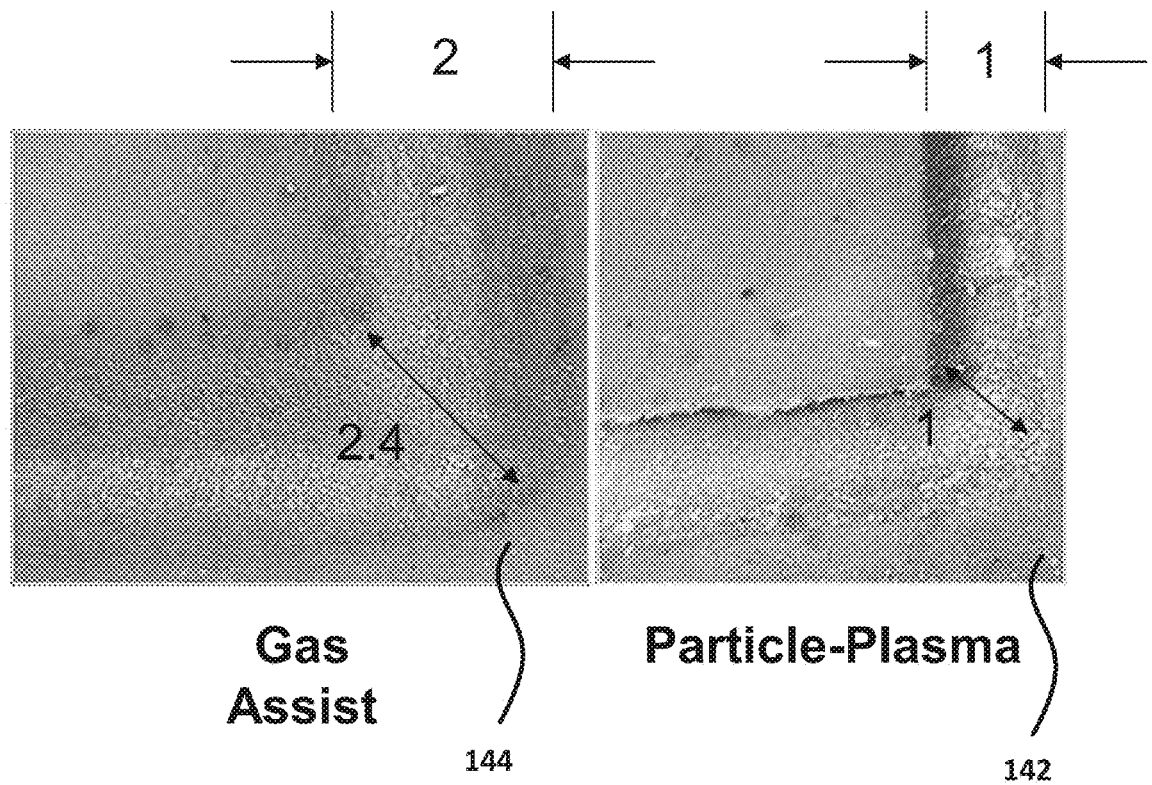
FIG. 8c-Picture comparing the surface channels (Kerfs) created on a fluorosilicone rubber substrate for a prior art process (gas-assisted laser) versus the present invention ($CO_2$ Composite Spray-assisted laser).

The performance characteristics of the present invention can be better understood by comparing a conventional IHR-gas assisted hybrid process to the present invention. FIGS. 8a, 8b and 8c contrast and compare the micro-machining performance between a gas-assisted laser and $CO_2$ particle assisted laser to machine a rectangular channel into a soft rubber polymer surface under identical laser power, distance and scan rate settings.

FIG. 8a compares micro-machining performance of fluorosilicone (FSR) rubber substrate using a near-infrared laser and a $CO_2$ Composite Spray ($CO_2$ Particles injected into a $N_2$ Propellant Gas) as compared to the same laser and settings with solely the nitrogen propellant gas at the same flowrate and pressure setting as used in the $CO_2$ Composite Spray. As can be seen in the photographs the present invention (130) produces a much better surface finish and channel structure as compared to gas-assisted laser micro-machining (132).

FIG. 8b compares micro-machining performance of n-butyl rubber (NBR) substrate using a near-infrared laser and a $CO_2$ Composite Spray ($CO_2$ Particles injected into a $N_2$ Propellant Gas) as compared to the same laser and settings with solely the nitrogen propellant gas at the same flowrate and pressure setting as used in the $CO_2$ Composite Spray. As can be seen in the photographs the present invention (134) produces a much better surface finish and channel structure as compared to gas-assisted laser micro-machining (136). As seen in FIG. 8a, the laser entrance beam can be seen as a very circular (and deep) pattern (138) at the perimeter. This is not the case for gas-assisted micro-machining process. It is evident from the shallow depth and blown-out walls of the laser-cut channels (140), also termed Kerfs, in the conventional process that $CO_2$ particles assist with mechanical ablation by removing ablated material from the path of the laser beam. Examining the channel surfaces under a microscope at 45× magnification, FIG. 8c, reveals superior definition and dimensional control using the present invention (142) as compared to a conventional gas-assisted laser micro-machining process (144).

Figures 9A, 9B:
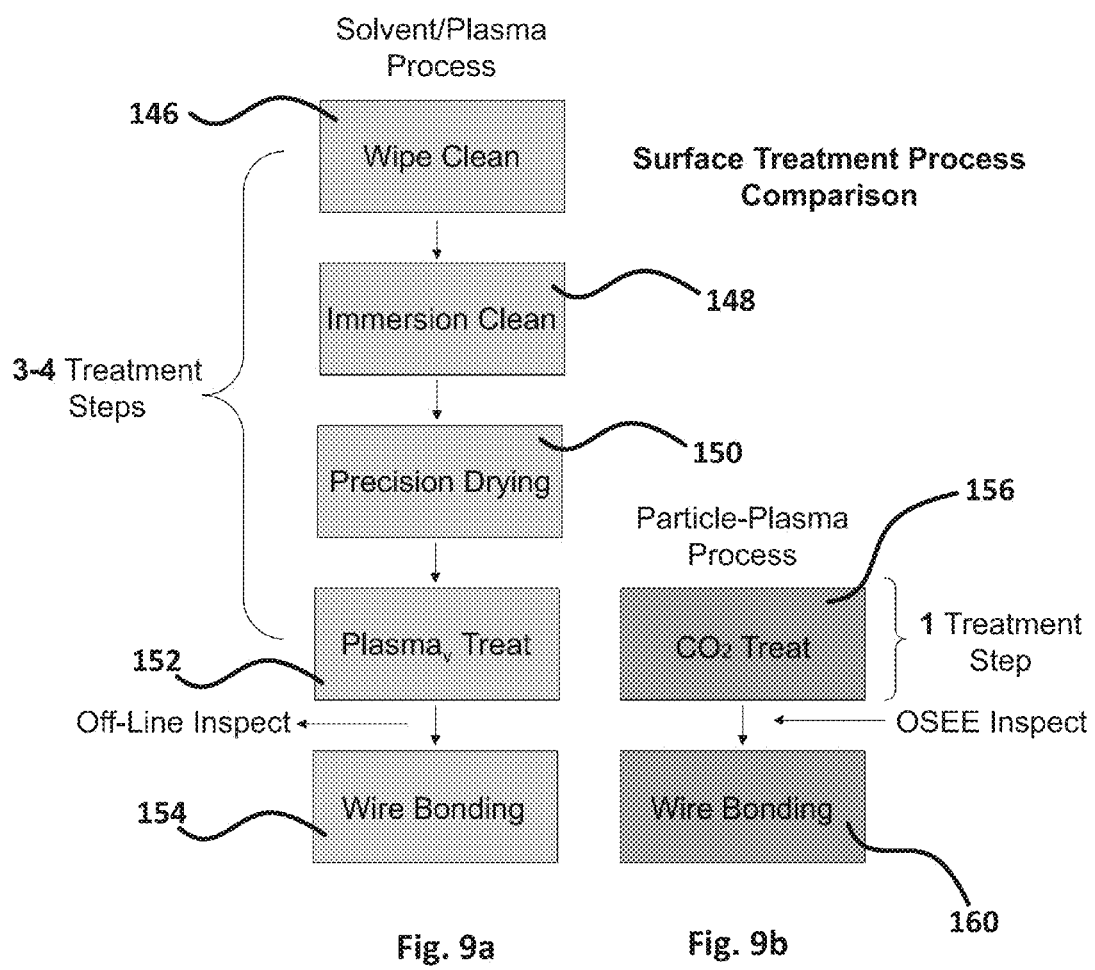
FIGS. 9a and 9b-Diagrams comparing the process changes from a prior art surface treatment method to the present invention for a wire bonding application, respectively.

The present invention decreases process time by eliminating the number of process steps associated with a conventional technique. FIG. 9a and FIG. 9b compare and contrast a conventional surface treatment method with the present invention, respectively, for an exemplary wire bonding application. FIG. 9a shows a conventional process that was replaced with the present invention. The surfaces of metallic bond pads contained on an electronic board are first wiped clean with a solvent (146), following which they are immersion cleaned using an ultrasonic aqueous cleaning bath (148) and precision dried using an alcohol dip (150). A vacuum plasma treatment using CDA is employed to perform a final surface clean and micro-etch (activation) of the metallic bond pad surfaces (152), following which the electronic boards are presented to a wire bonding machine for wire attachment (154). By contrast, FIG. 9b shows the new process using the present invention using a Blown Ion-$CO_2$ Composite Spray hybrid treatment process. A single-step Blown Ion-$CO_2$ Composite Spray treatment process (156) replaces the 4-step conventional process under FIG. 9a, following which the electronic boards are presented to a wire bonding machine for wire attachment (160).

In another example of process productivity improvement using the present invention, FIG. 10a, polymeric ophthalmic lenses are typically cleaned, etched, hard coated and cured following loading in a conventional multi-stage processing system and determination of proper process recipe (162). Referring to FIG. 10a, lenses are treated in 10 or more discrete steps using a multi-stage immersion alkaline cleaning-etching bath (164), heated deionized water rinse gross rinse (166), cascaded deionized water rinses (168), a final pure hot deionized water rinse with slow withdrawal of lenses (170) to prevent spotting, precision surface drying (172), and a dwell time to cool down dried lenses (174); following which room-temperature clean-etched lenses are coated (176) (i.e., Hard Coating) and cured (178) using thermal, IR and UV energy and manually or automatically unloaded (180) from the system. The conventional process requires numerous steps with significant amounts of deionized water, energy, and space. Moreover the conventional process requires careful handling and processing speeds during cleaning, etching, rinsing and drying steps to provide consistent coating adhesion, free of physical defects such as surface spots.

By contrast, and now referring to FIG. 10b, using the present invention to clean, etch and coat the same substrates as in 10a using a Blown Ion-$CO_2$ Composite Spray hybrid treatment process comprises only 5 steps with the new process comprising the steps—loading in a hybrid treatment and processing system and determination of proper process recipe (182), lenses are treated using a single-step Blown Ion-$CO_2$ particle surface treatment spray (184); and following which room-temperature clean-etched lenses are coated (186) (i.e., Hard Coating) and cured (190) using thermal, IR and UV energy and manually or automatically unloaded (192) from the system. The new process, shown in the picture 10b is much faster, more consistent, and 100% dry; with significant energy and space savings as compared to the conventional process.

In addition as an example, and also referring to FIG. 10b, using the present invention to clean, etch and prepare components for vacuum coating, the same substrate using a Blown Ion-$CO_2$ Composite Spray hybrid treatment process comprises only 3 steps with the new process comprising the steps—loading in a hybrid treatment and processing system and determination of proper process recipe (182), substrate is treated using a single-step Blown Ion-$CO_2$ particle surface treatment spray (184); and following which the room-temperature clean-etched substrates are prepared for vacuum coating and then manually or automatically unloaded (192) from the system. The new process, shown in part in the picture 10b (and with the exception of step (186) and step (190)) is much faster, more consistent, and 100% dry as compared than conventional method 10a; with significant energy and space savings as compared to the conventional process.

Examples of Use

Following are examples of use for the present invention:
Ion Etching of Polyethylene for Adhesive Bonding
Nd:YAG Laser Machining and Etching of Polyester Microfluidic Devices
$CO_2$ Laser Dicing of Semiconductor Wafers
Nd:YAG Laser Texturing of Titanium Alloy Implants
$CO_2$ Laser Welding of Titanium Electrodes
Blown Ion Plasma Treatment of Ophthalmic Lenses for Hard Coating
UV Light Treatment of Biomedical Devices (Cleaning-Disinfection)

Experimental

Surface Treatment and Hard Coating of Ophthalmic Lenses

Without being limiting, three commonly used ophthalmic polymer lens types (in the market) were tested using the present invention:
Substrates:
Substrates tested include polycarbonate, quasi-thermoset/thermoplastic (marketed under the registered trade names Trivex™ and Trilogy™), and plastic (marketed as under the registered trade name (Columbia Resin) CR-39™), grouped and described as follows:
PC: Polycarbonate
CR39™: Polyol(allyl) carbonate
Trivex™: Polyurea-polyurethane (polyureaurethane)
Fluids:
Particle Fluid—$CO_2$ Liquid, 99% Purity
IHR Fluid—$CO_2$ Gas, 99% Purity
Propellant—Clean Dry Air (CDA), 99.9% Purity
Coating—Proprietary Coating (Available from SDC Technologies)
IHR-$CO_2$ Spray Hybrid Test Apparatus and Configuration:
 1. $CO_2$ Particle Spray Generator: PowerSno, Model PS6000, $CO_2$ Composite Spray generator with coaxial Nozzle with 0.030 inch (by 6 foot length) capillary condenser, propellant (CDA) pressure adjusted to 40 psig, $CO_2$ particle generation adjusted approximately 5 pounds/hour, and propellant temperature adjusted to 125 C.
 2. IHR Generator: BlueFire, Blown Ion Plasma, Model BF-6000, Single spray nozzle using $CO_2$ feed gas at a pressure of 70 psig.
Both units supplied by CleanLogix LLC, Valencia, Calif.

The hybrid apparatus (Particle-Plasma stream projection and intersection specifically) was arranged so that the blown ion spray (Plasma Component) was directed into the $CO_2$ Composite Spray (Particle Component) flowing against the ophthalmic lens surface as shown under FIG. 4a. Using this spray configuration, the $CO_2$ spray particles (and propellant) are doped with beneficial ions, radicals, UV light, and ozone from the blown ion stream through both fluid shearing (e.g., Bernoulli Effect) and vortical mixing actions (e.g., Kelvin-Helmholtz Instability). As described herein, the $CO_2$ Composite Spray further serves as a chemical and physical cleaning and cooling barrier stream, transmitting and transporting beneficial UV radiation and reactants (i.e., ozone, oxygen radical, nitrate ions, hydroxyl, heat, etc.), respectively, to the polymer surface—simultaneously removing IHR-surface reaction by-products including excess heat and ablated, oxidized, or decomposed plastic surface.

Treatment Method:
Polymeric lenses (n=30 for each type) were subjected to a single pass of the exemplary IHR-$CO_2$ particle hybrid treatment spray at a rate of between approximately 100 mm/second and at a contact distance (from IHR head) of approximately 10 mm.

Test Method:
Performance testing using the present invention was performed by an independent testing laboratory. The particular test chosen was a Cycle Humidity Oven Cross Hatch Adhesion test, shorthand CHOCA. The adhesion performance scoring ranges from 0 to 5; where 0 is a complete fail and 5 represents no negative performance in the tested area (best score). Adhesion performance evaluations were performed several times throughout the time frame of the test as follows. The lenses were removed from the oven, and tape pulled three (3) times—in three (3) distinct test cycles. The lenses were exposed to cycling heat, salt water mist, and several tape pulls in an area that has been cut—cross-hatched—in a grid pattern, right through any hard coatings contained on the surface and down into the lens (substrate).

Figure 11B:
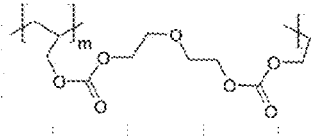
Figure 11C:
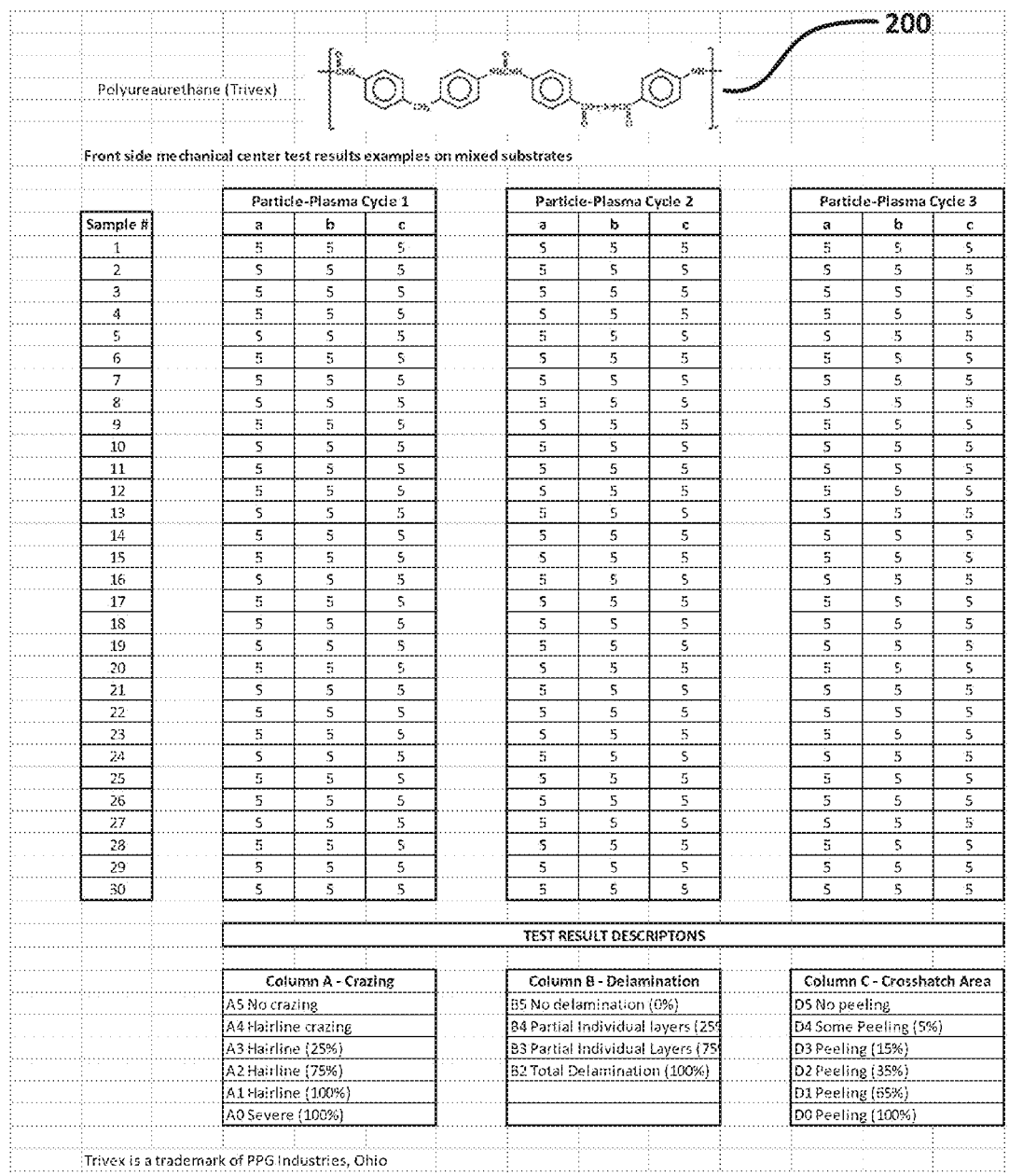

Results:
FIGS. 11a, 11b, and 11c show surface treatment evaluation matrices (coating quality) for polycarbonate (196), CR39™ (198), and Trivex™ (200) polymeric optical substrates respectively. All treated and coated lenses evaluated passed the performance test with 5×5×5 evaluations; perfect scores. Although this would also be true for some portion of current polymeric products using different conventional processes, the present invention proved to have a very large process window and was applied successfully to all of different types polymeric products tested. The significance of this test was that it demonstrated that the present invention can effectively treat many different types of surface chemistry.

The independent third-party testing laboratory that produced the test results certified that all analysis was conducted in accordance with a Quality Management System which is accredited by ACLASS to ISO/IEC 17025 standards as well as NADCAP standards. All analyses are performed in accordance with practices and procedures recognized by the American Society for Testing of Materials (ASTM), the American National Standards Institute (ANSI), and others as applicable.

Exemplary Method a (for Substrates)
A method for simultaneously modifying the same portion of a substrate surface; the method comprising the following steps:
Projecting and flowing a CO2 particle spray against a portion of a substrate surface; and
Simultaneously projecting one or more sources of ionizing-heating radiation (IHR) into said CO2 particle spray flowing against said same portion of substrate surface thus intersecting and mixing together to form an instantaneous surface treatment composition of IHR and CO2 particle spray flowing against same portion of substrate surface, respectively; and
Generating ablative reactions thereon using said IHR beam or plume while simultaneously cooling and eliminating ablated surface residues using said CO2 particle spray; and
Scanning same surface portions of entire substrate using said instantaneous IHR-CO2 particle spray surface treatment composition. Said CO2 particle spray of Step 1 can be and is preferably a CO2 Composite Spray. Said preferred CO2 Composite Spray of Step 2 can be and is preferably a composition of solid phase carbon dioxide particles, having variable particle size and concentration, entrained in a temperature-, pressure- and flow-controlled propellant gas comprising nitrogen or CDA. Said IHR of Step 1 is preferably derived from one or a combination of the following devices; UV Laser, NIR Laser, IR Laser, Blown Ion Plasma, Corona Plasma, RF Ablation, Pulsed UV Light, and IR Light device. Said UV, NIR and IR Lasers of Step 4 further include Excimer Laser, Semiconductor Laser, Diode Laser, Fiber Laser, Nd:YAG Laser and CO2 Laser. Said substrates of Step 1 include, among others, polymers, fibers, plastics, glass, composites, metals and ceramics, or combinations of same.

Exemplary substrates of Step 6 further comprise polyester, polyethylene, polycarbonate, polyureaurethane, Trivex™, CFRP, CR-39™, titanium, stainless steel, polyetheretherketone, polypropylene and carbon-fiber reinforced plastic (CFRP). CR-39 comprises "diallyl diglycol carbonate;" "allyl diglycol carbonate" is known commercially as the RAV7 line; the MR Series from Mitsui is made up of "Thiourethane polymers".

Preferred CO2 Composite Spray of Step 3 controls surface temperature by impinging a composition of CO2 solid particles and particle sizes entrained in a temperature-regulated and pressure-regulated propellant gas against said same surface portion. Preferred propellant gas of Step 8 comprises air, nitrogen, oxygen, carbon dioxide, argon, helium, or mixtures thereof. Preferred CO2 Composite Spray of Step 3 optionally contains gaseous or aerosol additives comprising silanes, siloxanes, fluorinates, amines, and other organic and inorganic compounds which provide beneficial surface chemistry during surface plasma reactions. Method of Step 1 scan treats the same portion of substrate surface at a rate of between 0.1 mm/sec and 300 mm/sec, and preferably between 10 mm/sec and 200 mm/sec.

1. A method for simultaneously ablating and functionalizing a portion of a substrate surface, comprising the following steps:
   Applying a CO2 particle spray against an unreacted portion of the substrate surface; and
   Simultaneously projecting at least one source of ionizing-heating radiation into said CO2 particle spray flowing against said unreacted portion of the substrate surface, thus intersecting and mixing together to form an instantaneous surface treatment composition of ionizing-heating radiation and CO2 particle spray flowing against the substrate surface, and to form and remove a reacted portion of the substrate surface.
2. The method of claim 1, wherein the CO2 particle spray is a CO2 Composite Spray.
3. The method of claim 2, wherein the CO2 Composite Spray is a composition of solid phase carbon dioxide particles, having variable particle size and concentration, entrained in a temperature-controlled, pressure-controlled, and flow-controlled propellant comprising a clean inert gas.
4. The method of claim 1, wherein said at least one source of ionizing-heating radiation is a UV Laser, NIR Laser, IR Laser, Blown Ion Plasma, Corona Plasma, RF Ablation, Pulsed UV Light, IR Light, Excimer Laser, Semiconductor Laser, Diode Laser, Fiber Laser, Nd:YAG Laser, and CO2 Laser.
5. The method of claim 1, wherein the substrate surfaces comprise polymers, fibers, plastics, glass, composites, metals, ceramics, polyester, polyethylene, polycarbonate, polyureaurethane, polysulfone, thiourea, titanium, stainless steel, polyetheretherketone, polypropylene and carbon-fiber reinforced plastic.
6. The method of claim 3, wherein the CO2 Composite Spray controls surface temperature by impinging a composition of CO2 solid particles and particle sizes entrained in the temperature-regulated and pressure-regulated propellant gas against said same surface portion.
7. The method of claim 3, wherein the propellant comprises air, nitrogen, oxygen, ozonated air, carbon dioxide, argon, or helium gas.
8. The method of claim 2, wherein the CO2 Composite Spray contains additives (including gaseous or aerosol) comprising silanes, siloxanes, fluorinates, amines or ozone or other organic and inorganic compounds, which provide beneficial surface chemistry during surface plasma reactions.
9. The method of claim 1, wherein the simultaneous ablation and functionalization is between 0.1 mm/sec and 300 mm/sec.
10. The method of claim 1, wherein the simultaneous ablation and functionalization is between 10 mm/sec and 200 mm/sec.
11. A method for simultaneously ablating and functionalizing a portion of a substrate surface, comprising the following steps:
    Applying a CO2 Composite Spray against an unreacted portion of the substrate surface; and
    Simultaneously projecting at least one source of ionizing-heating radiation into said CO2 Composite Spray flowing against said unreacted portion of the substrate surface, thus intersecting and mixing together to form an instantaneous surface treatment composition of ionizing-heating radiation and CO2 Composite Spray flowing against the substrate surface, and to form and remove a reacted portion of the substrate surface.

Exemplary Method B (for Optics and Polymeric Opthalmic Substrate Surfaces)

1. A method for simultaneously ablating and functionalizing a portion of a polymeric ophthalmic substrate surface, comprising the following steps:
   Applying a CO2 particle spray against an unreacted portion of the polymeric ophthalmic substrate surface; and
   Simultaneously projecting at least one source of ionizing-heating radiation into said CO2 particle spray flowing against said unreacted portion of the polymeric ophthalmic substrate surface, thus intersecting and mixing together to form an instantaneous surface treatment composition of ionizing-heating radiation and CO2 particle spray flowing against the polymeric ophthalmic substrate surface, and to form and remove a reacted portion of the polymeric ophthalmic substrate surface.
2. A method of claim 1, wherein the CO2 particle spray is a CO2 Composite Spray.
3. A method of claim 2, wherein the CO2 Composite Spray is a composition of solid phase carbon dioxide particles, having variable particle size and concentration, entrained in a temperature-controlled, pressure-controlled, and flow-controlled propellant comprising a clean inert gas.
4. A method of claim 1, wherein said at least one source of ionizing-heating radiation is a UV Laser, NIR Laser, IR Laser, Blown Ion Plasma, Corona Plasma, RF Ablation, Pulsed UV Light, IR Light, Excimer Laser, Semiconductor Laser, Diode Laser, Fiber Laser, Nd:YAG Laser, LED Laser and CO2 Laser.
5. A method of claim 1, wherein the polymeric ophthalmic substrate surfaces comprise polymers, plastics, composites, polyester, polyethylene, polycarbonate, acrylics, polymethylmethacrylate, polyureaurethane, polysulfone, thiourea, polyetheretherketone, polypropylene, polyamide, poly(amide-imide), polyimide, polyamide imide, poly(ester-imide), polyester imide and silicones.
6. A method of claim 3, wherein the CO2 Composite Spray controls surface temperature by impinging a composition of CO2 solid particles and particle sizes entrained in the temperature-regulated and pressure-regulated propellant gas against said same surface portion.

7. A method of claim 3, wherein the propellant comprises air, nitrogen, oxygen, ozonated air, carbon dioxide, argon, or helium gas.

8. A method of claim 2, wherein the CO2 Composite Spray contains additives (including gaseous or aerosol) comprising silanes, siloxanes, fluorinates, amines or ozone or other organic and inorganic compounds, which provide beneficial surface chemistry during surface plasma reactions.

9. A method of claim 1, wherein the simultaneous ablation and functionalization is between 0.1 mm/sec and 300 mm/sec.

10. A method of claim 1, wherein the simultaneous ablation and functionalization is between 10 mm/sec and 200 mm/sec.

11. A method for simultaneously ablating and functionalizing a portion of a polymeric ophthalmic substrate surface, comprising the following steps:

Applying a CO2 Composite Spray against an unreacted portion of the polymeric ophthalmic substrate surface; and Simultaneously projecting at least one source of ionizing-heating radiation into said CO2 Composite Spray flowing against said unreacted portion of the polymeric ophthalmic substrate surface, thus intersecting and mixing together to form an instantaneous surface treatment composition of ionizing-heating radiation and CO2 Composite Spray flowing against the polymeric ophthalmic substrate surface, and to form and remove a reacted portion of the polymeric ophthalmic substrate surface.

12. A method of claim 11, wherein the CO2 Composite Spray is a composition of solid phase carbon dioxide particles, having variable particle size and concentration, entrained in a temperature-controlled, pressure-controlled, and flow-controlled propellant comprising a clean inert gas.

13. A method of claim 11, wherein said at least one source of ionizing-heating radiation is a UV Laser, NIR Laser, IR Laser, Blown Ion Plasma, Corona Plasma, RF Ablation, Pulsed UV Light, IR Light, Excimer Laser, Semiconductor Laser, Diode Laser, Fiber Laser, Nd:YAG Laser, LED Laser and CO2 Laser.

14. A method of claim 11, wherein the polymeric ophthalmic substrate surfaces comprise polymers, plastics, composites, polyester, polyethylene, polycarbonate, acrylics, polymethylmethacrylate, polyureaurethane, polysulfone, thiourea, polyetheretherketone, polypropylene, polyamide, poly(amide-imide), polyimide, polyamide imide, poly(ester-imide), polyester imide and silicones.

15. A method of claim 11, wherein the CO2 Composite Spray controls surface temperature by impinging a composition of CO2 solid particles and particle sizes entrained in the temperature-regulated and pressure-regulated propellant gas against said same surface portion.

16. A method of claim 12, wherein the propellant comprises air, nitrogen, oxygen, ozonated air, carbon dioxide, argon, or helium gas.

17. A method of claim 11, wherein the CO2 Composite Spray wherein the CO2 Composite Spray contains additives (including gaseous or aerosol) comprising silanes, siloxanes, fluorinates, amines or ozone or other organic and inorganic compounds, which provide beneficial surface chemistry during surface plasma reactions.

18. A method of claim 11, wherein the simultaneous ablation and functionalization is between 0.1 mm/sec and 300 mm/sec.

19. A method of claim 11, wherein the simultaneous ablation and functionalization is between 10 mm/sec and 200 mm/sec.

It should be understood that the present invention is not limited to the example compositions, and applications described herein. For example, the present invention may be used to clean, etch, mark, machine and functionalize any variety of substrate materials including, but not limited to, glass, ceramics, plastics, polymers, composites and metals; in preparation for assembly, bonding, coating, underfilling, welding, soldering, inspection, and other fabrication processes.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The listed ranges in these examples are not intended to be limiting.

Further, the title, headings, terms and phrases used herein are not intended to limit the subject matter or scope; but rather, to provide an understandable description of the invention. The invention is composed of several sub-parts that serve a portion of the total functionality of the invention independently and contribute to system level functionality when combined with other parts of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Any element in a claim that does not explicitly state "means for" performing a specific function, or "step for" performing a specific function, is not be interpreted as a "means" or "step" clause as specified in 35 U.S.C. Sec. 112, Paragraph 6. In particular, the use of "step of" in the claims herein is not intended to invoke the provisions of 35 U.S.C. Sec. 112, Paragraph 6.

We claim:

1. A method for simultaneously ablating and functionalizing a portion of a substrate surface, comprising the following steps:

Applying a CO2 particle spray against an unreacted portion of the substrate surface; and Simultaneously projecting at least one source of ionizing-heating radiation into said CO2 particle spray flowing against said unreacted portion of the substrate surface, thus intersecting and mixing together to form an instantaneous surface treatment composition of ionizing-heating radiation and CO2 particle spray flowing against the substrate surface, and to form and remove a reacted portion of the substrate surface; and the at least one source of ionizing-heating radiation is Blown Ion Plasma or Corona Plasma.

2. The method of claim 1, wherein the CO2 particle spray is a CO2 Composite Spray.

3. The method of claim 2, wherein the CO2 Composite Spray is a composition of solid phase carbon dioxide particles, having variable particle size and concentration, entrained in a temperature-controlled, pressure-controlled, and flow-controlled propellant comprising a clean inert gas.

4. The method of claim 1, wherein said at least one source of ionizing-heating radiation is a UV Laser, NIR Laser, IR Laser, RF Ablation, Pulsed UV Light, IR Light, Excimer Laser, Semiconductor Laser, Diode Laser, Fiber Laser, Nd:YAG Laser, and CO2 Laser.

5. The method of claim 1, wherein the substrate surfaces comprise polymers, fibers, plastics, glass, composites, metals, ceramics, polyester, polyethylene, polycarbonate, polyureaurethane, polysulfone, thiourea, titanium, stainless steel, polyetheretherketone, polypropylene and carbon-fiber reinforced plastic.

6. The method of claim 3, wherein the CO2 Composite Spray controls surface temperature by impinging a composition of CO2 solid particles and particle sizes entrained in the temperature-regulated and pressure-regulated propellant gas against said same surface portion.

7. The method of claim 3, wherein the propellant comprises air, nitrogen, oxygen, ozonated air, carbon dioxide, argon, or helium gas.

8. The method of claim 2, wherein the CO2 Composite Spray contains additives comprising silanes, siloxanes, fluorinates, amines or ozone, which provide beneficial surface chemistry during surface plasma reactions.

9. The method of claim 1, wherein the simultaneous ablation and functionalization is between 0.1 mm/sec and 300 mm/sec.

10. The method of claim 1, wherein the simultaneous ablation and functionalization is between 10 mm/sec and 200 mm/sec.

11. A method for simultaneously ablating and functionalizing a portion of a substrate surface, comprising the following steps:
Applying a CO2 Composite Spray against an unreacted portion of the substrate surface; and
Simultaneously projecting at least one source of ionizing-heating radiation into said CO2 Composite Spray flowing against said unreacted portion of the substrate surface, thus intersecting and mixing together to form an instantaneous surface treatment composition of ionizing-heating radiation and CO2 Composite Spray flowing against the substrate surface, and to form and remove a reacted portion of the substrate surface; and
the at least one source of ionizing-heating radiation is Blown Ion Plasma or Corona Plasma.

12. The method of claim 11, wherein the CO2 Composite Spray is a composition of solid phase carbon dioxide particles, having variable particle size and concentration, entrained in a temperature-controlled, pressure-controlled, and flow-controlled propellant comprising a clean inert gas.

13. The method of claim 11, wherein said at least one source of ionizing-heating radiation is a UV Laser, NIR Laser, IR Laser, RF Ablation, Pulsed UV Light, IR Light, Excimer Laser, Semiconductor Laser, Diode Laser, Fiber Laser, Nd:YAG Laser, and CO2 Laser.

14. The method of claim 11, wherein the substrate surfaces comprise polymers, fibers, plastics, glass, composites, metals, ceramics, polyester, polyethylene, polycarbonate, polyureaurethane, polysulfone, thiourea, titanium, stainless steel, polyetheretherketone, polypropylene and carbon-fiber reinforced plastic.

15. The method of claim 11, wherein the CO2 Composite Spray controls surface temperature by impinging a composition of CO2 solid particles and particle sizes entrained in the temperature-regulated and pressure-regulated propellant gas against said same surface portion.

16. The method of claim 11, wherein the propellant comprises air, nitrogen, oxygen, ozonated air, carbon dioxide, argon, or helium gas.

17. The method of claim 11, wherein the CO2 Composite Spray contains additives comprising silanes, siloxanes, fluorinates, amines or ozone, which provide beneficial surface chemistry during surface plasma reactions.

18. The method of claim 11, wherein the simultaneous ablation and functionalization is between 0.1 mm/sec and 300 mm/sec.

19. The method of claim 11, wherein the simultaneous ablation and functionalization is between 10 mm/sec and 200 mm/sec.

* * * * *